(12) United States Patent
Costa et al.

(10) Patent No.: US 9,823,476 B2
(45) Date of Patent: Nov. 21, 2017

(54) INTEGRATED MOBILE DEVICE SHIPPING CONTAINER AND VIRTUAL REALITY HEADSET

(71) Applicant: GOOGLE INC., Mountain View, CA (US)

(72) Inventors: Antonio Bernardo Monteiro Costa, San Francisco, CA (US); Damien Henry, Malakoff (FR); Joshua Weaver, Mountain View, CA (US); Christian Plagemann, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 97 days.

(21) Appl. No.: 14/815,124

(22) Filed: Jul. 31, 2015

(65) Prior Publication Data

US 2017/0031164 A1    Feb. 2, 2017

(51) Int. Cl.
*G02B 27/01*    (2006.01)
*G02B 27/22*    (2006.01)

(52) U.S. Cl.
CPC ....... *G02B 27/0176* (2013.01); *G02B 27/017* (2013.01); *G02B 27/22* (2013.01);
(Continued)

(58) Field of Classification Search
CPC ........ G02B 2027/0169; G02B 27/0176; G02B 27/101; G02B 27/0149; G02B 27/0127
See application file for complete search history.

(56) References Cited

U.S. PATENT DOCUMENTS

| 5,344,065 A | 9/1994 | Moran |
| D374,002 S | 9/1996 | Bassett et al. |

(Continued)

FOREIGN PATENT DOCUMENTS

| CN | 204188882 U | 3/2015 |
| EP | 0708350 A1 | 4/1996 |

(Continued)

OTHER PUBLICATIONS

Tested, https://www.youtube.com/watch?v=eT9vmpE8WcY: "Hands-On with Google Cardboard" Published Jun. 30, 2014.*
(Continued)

*Primary Examiner* — Darryl J Collins
*Assistant Examiner* — Journey Sumlar
(74) *Attorney, Agent, or Firm* — Brake Hughes Bellermann LLP

(57) ABSTRACT

In a general aspect, an apparatus can include a goggle portion having a chassis that is open on a first side, a lens assembly disposed on a second side of the chassis of the goggle portion and a ledge disposed around an interior perimeter of the chassis of the goggle portion. The ledge can be configured to physically support an electronic device inserted in the goggle portion. The apparatus can also include a cover portion having a chassis that is open on a first side and at least partially closed on a second side. The cover portion can be configured to be placed over the goggle portion, such that at least a portion of the goggle portion is disposed within the cover portion and the electronic device is retained between the ledge and an interior surface of the second side of the cover portion.

20 Claims, 16 Drawing Sheets

(52) U.S. Cl.
CPC .............. *G02B 2027/0134* (2013.01); *G02B 2027/0138* (2013.01)

(56) References Cited

U.S. PATENT DOCUMENTS

| | | | |
|---|---|---|---|
| 6,046,727 | A | 4/2000 | Rosenberg |
| 8,303,123 | B2 | 11/2012 | Kory |
| D687,434 | S | 8/2013 | Serota |
| D701,206 | S | 3/2014 | Luckey et al. |
| 8,686,959 | B2 | 4/2014 | Payne |
| D704,704 | S | 5/2014 | Tatara et al. |
| D719,953 | S | 12/2014 | Nokuo et al. |
| 8,908,015 | B2 | 12/2014 | Capper |
| 8,957,835 | B2 | 2/2015 | Hoellwarth |
| D727,318 | S | 4/2015 | Garcia |
| D732,028 | S | 6/2015 | Kim et al. |
| D738,374 | S | 9/2015 | Luckey et al. |
| D740,814 | S | 10/2015 | Bosveld et al. |
| 9,176,325 | B2 | 11/2015 | Lyons |
| D749,583 | S | 2/2016 | Trexler et al. |
| D751,072 | S | 3/2016 | Lyons et al. |
| D753,111 | S | 4/2016 | Zhu et al. |
| D755,789 | S | 5/2016 | Lyons et al. |
| D757,003 | S | 5/2016 | Goossens et al. |
| D765,658 | S | 9/2016 | Spio et al. |
| D766,896 | S | 9/2016 | Lou et al. |
| D792,398 | S | 7/2017 | Costa et al. |
| 2010/0079356 | A1 | 4/2010 | Hoellwarth et al. |
| 2010/0277575 | A1 | 11/2010 | Ismael |
| 2013/0147721 | A1 | 6/2013 | McGeever |
| 2014/0176608 | A1 | 6/2014 | Boysen et al. |
| 2014/0247246 | A1 | 9/2014 | Maus |
| 2014/0267637 | A1 | 9/2014 | Hoberman |
| 2015/0138645 | A1 | 5/2015 | Kim |
| 2015/0215608 | A1 | 7/2015 | Tahara |
| 2015/0234189 | A1* | 8/2015 | Lyons ............... G02B 27/0172 345/174 |
| 2015/0253574 | A1 | 9/2015 | Thurber |
| 2016/0062454 | A1* | 3/2016 | Wang .................... G09G 5/003 345/633 |
| 2016/0180591 | A1 | 6/2016 | Chang |
| 2016/0203642 | A1 | 7/2016 | Thomas |
| 2016/0349836 | A1 | 12/2016 | Goossens et al. |
| 2017/0031165 | A1 | 2/2017 | Costa et al. |

FOREIGN PATENT DOCUMENTS

| | | | |
|---|---|---|---|
| EP | 2942305 | A1 | 11/2015 |
| ES | 1115455 | U | 7/2014 |
| GB | 2516242 | A | 1/2015 |
| WO | 2012035174 | A1 | 3/2012 |
| WO | 2014057557 | A1 | 4/2014 |
| WO | 2014103006 | A1 | 7/2014 |
| WO | 2014108693 | A1 | 7/2014 |

OTHER PUBLICATIONS

Notice of Allowance for U.S. Appl. No. 29/516,996, dated Oct. 23, 2015, 12 pages.
International Search Report and Written Opinion for PCT Application No. PCT/US2016/033212, dated Sep. 23, 2016, 15 pages.
Invitation to Pay Add'l Fees and Partial Search Report for PCT Application No. PCT/US2016/033212, dated Aug. 1, 2016, 7 Pages.
Invitation to Pay Add'l Fees and Partial Search Report for PCT Application No. PCT/US2016/43492, dated Oct. 6, 2016, 7 Pages.
"Google Cardboard", promotional materials found at www.goggle.com/cardboard, printed May 12, 2015, 3 pages. First available approximately Jun. 27, 2014.
"Multipart Plan" dated Feb. 26, 2014, 1 page.
"Photo 1" posted to Instagram by inventor on Oct. 6, 2013, 1 page.
"Photo 2" posted to Instagram by inventor on Oct. 6, 2013, 1 page.
"Photo 3" posted to Instagram by inventor on Oct. 6, 2013, 1 page.
Brewster, "Why Google Cardboard is actually a huge boost for virtual reality", retrieved on Jun. 24, 2016 from https://gigaom.com/2014/06/28/why-google-cardboard-is-actually-a-huge-boost-for-virtual-reality/, Jun. 28, 2014, 7 pages.
Dodocase, "DODOcase Virtual Reality Kit 1.2 Assembly Instruction Video YouTube", retrieved on Jun. 24, 2016 from https://www.youtube.com/watch?v=ze1528521Yw, Oct. 8, 2014, 3 pages.
Evans, "The Exciting Possibilities of DIY Virtual Reality", retrieved on Jun. 24, 2016 from http://blog.fictiv.com/posts/the-exciting-possibilities-of-diy-virtual-reality, Dec. 8, 2014, 11 pages.
Hoberman, et al., "Immersive Training Games for Smartphone-Based Head Mounted Displays", retrieved on Jun. 24, 2016 from http://projects.ict.usc.edu/mxr/wp-content/uploads/2011/12/SmartphoneVR.pdf, 2012, 2 pages.
Ladysith, "Copper tape touch extension for Cardboard VR kits", retrieved on Jun. 24, 2016 from https://web.archive.org/web/20150101222824/http://www.instructables.com/id/CoppertapetouchextensionforCardboardVRkits, Jan. 1, 2015, 6 pages.
International Search Report and Written Opinion for PCT Application No. PCT/US16/34756, dated Sep. 2, 2016, 10 pages.
Touthackamon, "How to make DODOCase VR kit V 1.2 from your old V 1.1", retrieved on Jun. 24, 2016 from https://web.archive.org/web/20141101135535/http://www.instructables.com/id/How-to-make-DODOCase-VR-kit-V-12-from-your-old-V-1/, Nov. 1, 2014, 8 pages.
International Search Report and Written Opinion for PCT Patent Application No. PCT/US2016/043492, dated Dec. 2, 2016, 13 pages.
Notice of Allowance for U.S. Appl. No. 29/534,813, dated Mar. 21, 2017, 39 pages.
Non Final Office Action for U.S. Appl. No. 14/617,223, dated Feb. 27, 2017, 45 pages.
Written Opinion for PCT Application No. PCT/US16/34758, dated Jul. 3, 2017, 5 pages.

* cited by examiner

INTEGRATED MOBILE DEVICE SHIPPING CONTAINER AND VIRTUAL REALITY HEADSET

TECHNICAL FIELD

This disclosure relates to repurposed mobile device packing (e.g., shipping containers). More specifically, this disclosure relates to packaging for mobile devices (e.g., shipping containers) that include integrated virtual reality headsets.

SUMMARY

In a general aspect, an apparatus can include a goggle portion having a chassis that is open on a first side, a lens assembly disposed on a second side of the chassis of the goggle portion and a ledge disposed around an interior perimeter of the chassis of the goggle portion. The ledge can be configured to physically support an electronic device inserted from the first side of the chassis of the goggle portion. The apparatus can also include a cover portion having a chassis that is open on a first side and at least partially closed on a second side. The cover portion can be configured to be placed over the goggle portion, such that at least a portion of the goggle portion is disposed within the cover portion and the electronic device is retained between the ledge and an interior surface of the second side of the cover portion.

Implementations can include one or more of the following features. For instance, the chassis of the goggle portion can includes a left wall, a right wall, a bottom wall and a top wall. The left wall, the right wall, the bottom wall and the top wall of the goggle portion can define the open, first side of the goggle portion. The lens assembly and the bottom wall can have a cutout defined therein. The cutout can be configured for placement over a nose of a user.

The chassis of the cover portion can include a left wall, a right wall, a bottom wall and a top wall. The left wall, the right wall, the bottom wall and the top wall of the cover portion can define the open, first side of the cover portion. The bottom wall can have a cutout defined therein. The cutout can be configured for placement over a nose of a user.

The lens assembly can include a first aperture, a second aperture, a first aspherical lens disposed within the first aperture and a second aspherical lens disposed within the second aperture. A focal length of the first aspherical lens and a focal length of the second aspherical lens can be based, at least in part, on a distance from the lens assembly to a surface of a display of the electronic device when the electronic device is placed on the ledge with the display facing the lens assembly.

The second side of the cover portion can have an aperture defined therein. The aperture can be configured to expose a camera of the electronic device when the electronic device is placed on the ledge with the camera facing the second side of the cover portion and the cover portion is placed over the goggle portion.

The apparatus can include an input mechanism disposed on the chassis of the goggle portion. The input mechanism can be configured to interact with the electronic device. The input mechanism can include a magnetic input device. The input mechanism can include a button. The input mechanism can be disposed on one of the left wall of the chassis of the goggle portion and the right wall of the chassis of the goggle portion. The chassis of the cover portion can include an aperture that is configured to facilitate access to the input mechanism when the cover portion is placed over the goggle portion.

The apparatus can include a sleeve configured to slidably fit over the goggle portion and the cover portion when the cover portion is placed over the goggle portion. The apparatus can include a protective liner configured to be placed within the goggle portion to cover the lens assembly. The protective liner can include a tab disposed thereon, the tab being configured to facilitate removal of the protective liner from the goggle portion.

In another general aspect, an article of manufacture can include a goggle portion having a chassis that is open on a first side, a lens assembly disposed on a second side of the chassis of the goggle portion and a ledge disposed around an interior perimeter of the chassis of the goggle portion. The article of manufacture can also include a cover portion having a chassis that is open on a first side and at least partially closed on a second side. The cover portion can be configured to be placed over the goggle portion, such that at least a portion of the goggle portion is disposed within the cover portion. The article of manufacture can further include a protective liner configured to be placed within the goggle portion to cover the lens assembly. The article of manufacture can also further include a sleeve configured to slidably fit over the goggle portion and the cover portion when the cover portion is placed over the goggle portion.

Implementations can include one or more of the following features. For instance, the lens assembly can include a first aperture, a second aperture, a first aspherical lens disposed within the first aperture and a second aspherical lens disposed within the second aperture. The article of manufacture can include an input mechanism disposed on the chassis of the goggle portion, the input mechanism being configured to interact with an electronic device disposed within the article of manufacture. The protective liner can include a tab disposed thereon, the tab being configured to facilitate removal of the protective liner from the goggle portion.

The details of one or more implementations are set forth in the accompanying drawings and the description below. Other features will be apparent from the description and drawings, and from the claims.

Figure 1:
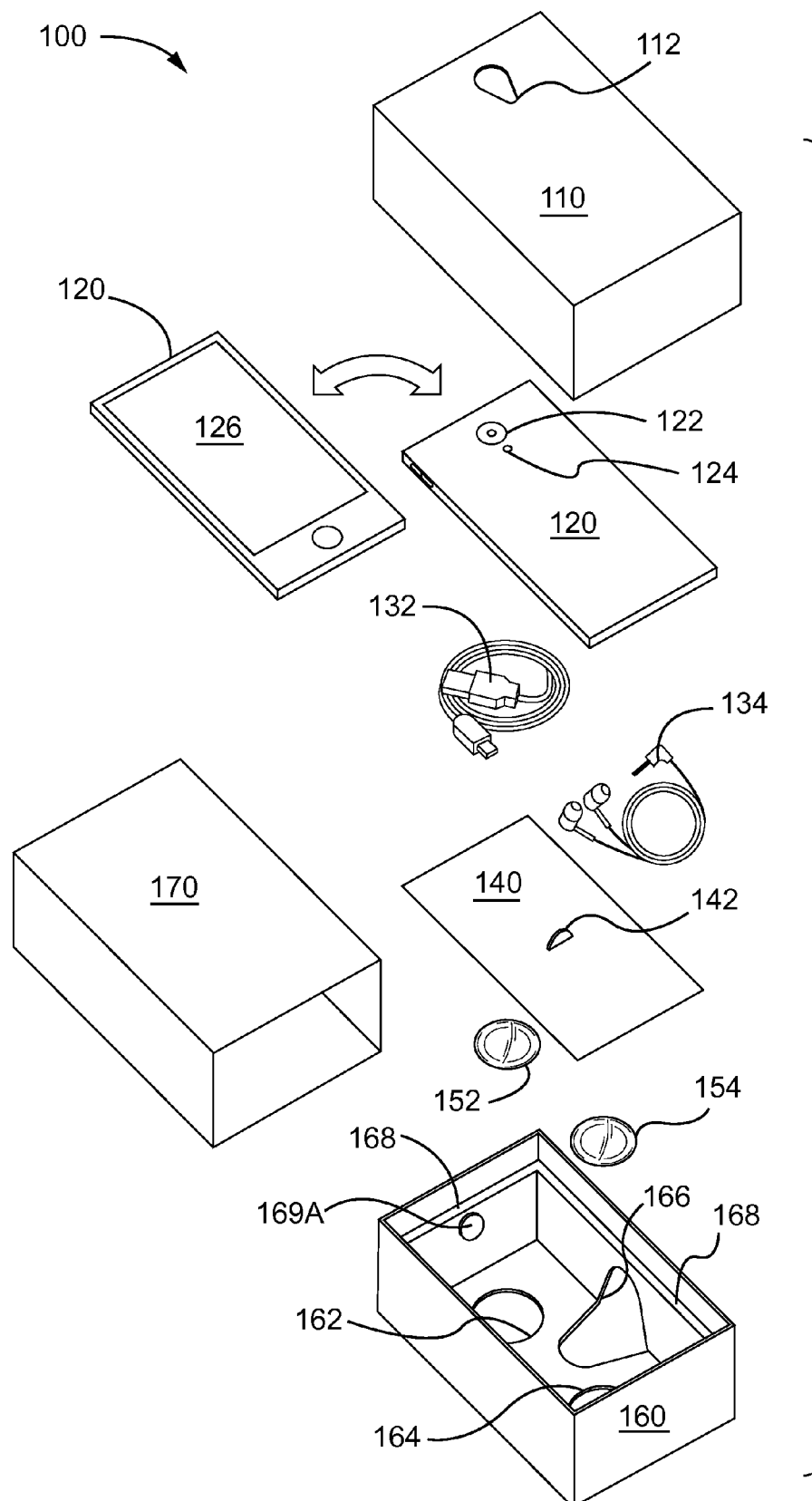
FIG. 1 is a drawing illustrating an exploded, perspective view of an integrated mobile device shipping container (packaging) and virtual reality (VR) headset, according to an implementation.

Like reference symbols in the various drawings indicate like elements. Reference numbers for some like elements may not be repeated for all such elements. Some reference numbers for certain elements of a given implementation may not be repeated in each drawing corresponding with that implementation. Some reference numbers for certain elements of a given implementation may be repeated in other drawings corresponding with that implementation, but may not be specially discussed with reference to each corresponding drawing.

DETAILED DESCRIPTION

This disclosure is directed to virtual reality (VR) headsets (which can also be referred to as VR goggles) that can be provided to users at a relatively low cost, as compared with other VR headset implementations. The VR headsets described herein can be integrated with a shipping container (e.g., commercial packaging) that can be used to ship a corresponding consumer electronic device (e.g., a smartphone, tablet, etc.) from a manufacturer to a consumer. That is, a consumer can use such an integrated shipping container and VR headset (in which the consumer receives the corresponding electronic device) to experience visual images associated with VR applications or content that can be executed or played on the corresponding electronic device. For purposes of this disclosure, an integrated shipping container and VR headset may also be referred to as an integrated shipping container, integrated packaging, a shipping container, packaging, an integrated VR headset, an integrated headset, a VR headset, a headset, and so forth.

Such an integrated shipping container (for a given consumer electronic device) may be repurposed (e.g., by a receiving consumer) as a VR headset (e.g., where the integrated VR headset is specifically designed for use with the given electronic device), where the elements of the VR headset are integrated with one or more elements of the shipping container. For instance, after receiving an electronic device that is packaged and shipped using such an integrated shipping container, a consumer can unpack the electronic device from the integrated shipping container, remove one or more accessories (e.g., cables, etc.), remove (e.g., discard or recycle) any protective packaging materials (such as those described herein), and insert and secure the electronic device in the integrated VR headset in an orientation suitable for viewing a display of the electronic device with the integrated VR headset. The consumer can then view images associated with (produced by) VR applications or content (e.g., executed or played by the electronic device), where those images are displayed on a display panel of the electronic device (e.g., a smartphone, tablet, or the like) and viewed using the integrated VR headset, so as to experience the content as virtual reality content (e.g., in a virtual, 3-dimensional view).

The integrated shipping container and VR headset implementations shown in the figures and described herein are given by way of example. Accordingly, features of one implementation can be included in other implementations, where appropriate. Further, features of a given implementation can be omitted in other implementations. Also, the elements of the implementations shown in the figures and described herein are illustrative and may not be shown to scale. Further, the arrangement of the particular elements of a given apparatus can depend on the specific implementation.

For purposes of this disclosure, the various elements of the example integrated shipping container and VR headset implementations illustrated and described herein may be referenced using relative terms, such as top, left, right, bottom, etc. These terms are used by way of illustration to describe the example implementations. In other implementations, or other orientations, these references may change. For instance, a left side of a VR headset in one view may be referred to as a right side in another view of that VR headset, or in another VR headset implementation.

Additionally, elements of the integrated shipping container and VR headset implementations described herein may be referred to using enumerated references, e.g., first, second, etc. As noted above with respect to relative references, such enumerated references could change depending on the particular orientation (in a given drawing) or the particular implementation of an integrated shipping container and VR headset. For instance a first end or side in one view could be referred to as a second end or side in another view, or when discussing a different integrated VR headset implementation.

Further, elements of a given implementation shown in one drawing may not be shown in another drawing for that implementation. For instance, electronic device accessories and protective packaging materials (e.g., used for shipping purposes) shown in FIG. 1 are not shown in other drawings directed to that implementation.

FIG. 1 is a drawing illustrating an exploded, perspective view of an integrated mobile device shipping container (packaging) and virtual reality (VR) headset 100, according to an implementation. In FIG. 1, the integrated shipping container and VR headset 100 is illustrated with elements that may be included when using the integrated shipping container and VR headset 100 is used as a shipping container (e.g., commercial packaging). As shown, in FIG. 1, the integrated shipping container and VR headset 100, in this implementation, can include a cover portion 110, a protective liner 140, a goggle portion 160 (in which lenses 152 and 154 are affixed or mounted) and a sleeve (outer sleeve) 170. As also illustrated in FIG. 1, the integrated shipping container and VR headset 100 may be used to ship an electronic device 120 (such as a smartphone, tablet, or the like) and accessories for the electronic device 120 to a consumer. As shown in FIG. 1, such accessories can include a Universal Serial Bus (USB) charging cable 132 and a headset 134. It will be appreciated that, in other implementations, the integrated shipping container and VR headset 100 can have other configurations and can be used to ship different components than those shown in and/or described with respect to FIG. 1.

In some implementations, the integrated shipping container and VR headset 100 can include a near-field communications (NFC) tag (not shown). For instance, such an NFC tag can take the form of an adhesive backed tag or sticker that is affixed to, for example, the cover portion 110 of the integrated shipping container and VR headset 100. Such an NFC tag can be used to identify the integrated VR headset 100 to the electronic device 120 when the electronic device 120 is inserted in the integrated VR headset 100.

Identification of the integrated VR headset 100 by the electronic device 120 using such an NFC tag may allow the electronic device 120 to determine, for instance, that the integrated VR headset 100 corresponds the with electronic device 120 (e.g., is designed specifically for the electronic device). In other implementations, such an NFC tag can be used to allow for a different electronic device (e.g., one not shipped in the integrated shipping container and VR headset 100 and for which the integrated VR headset 100 is not specifically designed) to determine a number of characteristics about the VR headset, such as a focal length of the lenses 152 and 154, physical dimensions of the integrated VR headset 100, etc. Other electronic devices (e.g., for which the integrated VR headset 100 is not specifically designed for) may use such characteristics of the integrated VR headset 100 (e.g., determined from an NFC tag) to modify how those devices render visual VR content (e.g., to improve a user experience).

In other implementations, a 3D visual token (not shown) can be included as an additional accessory (e.g., along with the USB cable 132 and the headset 134) when shipping the electronic device 120 to a consumer using the integrated shipping container and VR headset 100. Such a 3D token can be used in conjunction with an augmented reality application (e.g., a VR application or VR content). For instance, a user can hold and/or manipulate the 3D token in front of the camera 124 of the electronic device 120 when it is running such an augmented reality application. In such an approach, the augmented reality application can then provide the user with a visual experience of manipulating a 3D object in VR space (e.g., based on the user's movement and/or manipulation of the 3D visual token).

As shown in FIG. 1, the electronic device 120 can be placed in the integrated shipping container and VR headset 100 (e.g., in the goggle portion 160 as described herein), either with a display 126 of the electronic device 120 facing up (e.g., the orientation of the electronic device 120 shown on the left in FIG. 1) or with a camera 122 and flash 124 facing up (e.g., the orientation of the electronic device 120 shown on the right in FIG. 1).

In this implementation, the electronic device 120 may be placed in the display 126 up orientation when the integrated shipping container and VR headset 100 is used to ship the electronic device 120 to a consumer. Further in this implementation, the electronic device 120 may be placed in the camera 122 and flash 124 up orientation (with the USB cable 132, headphones 134, protective liner 140 and sleeve 170 removed) when the integrated shipping container and VR headset 100 is used as a VR headset (e.g., when using the electronic device 120 to view VR images associated with executing and/or playing VR applications and/or content on the electronic device 120).

As shown in FIG. 1, the goggle portion 160 of the integrated shipping container and VR headset 100 can include a rectangular chassis that is open on a first side. In other implementations, the chassis can have other configurations. For instance, the rectangular chassis of the goggle portion 160 can include a left wall, a right wall, a bottom wall and a top wall, such as shown in FIG. 1. In such an approach, the left wall, the right wall, the bottom wall and the top wall of the goggle portion 160 can define an open, first side of the goggle portion 160 (e.g., the upward facing side of the goggle portion 160 in FIG. 1).

As illustrated in FIG. 1, the goggle portion 160 can also include a lens assembly that is disposed on a second side of the rectangular chassis of the goggle portion 160, the second side being opposite the open first side. The lens assembly of the goggle portion 160 can have a first aperture 162 and a second aperture 164 defined therein. In this implementation, a first lens (e.g., an aspherical lens) 152 can be mounted (affixed, disposed, etc.) in the first aperture 162 of the lens assembly. Similarly, in the integrated shipping container and VR headset 100 of FIG. 1, a second lens (e.g., an aspherical lens) 154 can be mounted (affixed, disposed, etc.) in the second aperture 164 of the lens assembly.

The lenses 152 and 154 can be mounted in their respective apertures 162 and 164 using a number of possible approaches. For instance, the lens assembly can include multiple layers and the aspherical lenses 152 and 154 can be mounted between those layers. In such approaches, the apertures 162 and 164 can have retention tabs (not shown) disposed around their perimeters, where the tabs are configured to hold the lenses 152 and 154 in place in the apertures 162 and 164 without causing significant occlusion of the lenses. In other approaches, an adhesive can be used to affix the aspherical lens 152 and 154 in their respective apertures 162 and 164. In still other implementations, other techniques can be used to secure the lenses 152 and 154 in their respective apertures 162 and 164.

As also shown in FIG. 1, the goggle portion 160 can include a cutout 166 defined in the lens assembly and the bottom wall of the rectangular chassis of the goggle portion 160. The cutout 166 can be configured to allow for placement of the integrated VR headset 100 over a nose of a user when viewing VR content displayed on the display 126 of the electronic device 120. As discussed below with respect to FIG. 2, the cover portion 110 can have a cutout (cutout 114 not shown in FIG. 1) that corresponds with the portion of the cutout 166 defined in the bottom wall of the rectangular chassis of the goggle portion 160.

The goggle portion 160 of the integrated shipping container and VR headset 100 of FIG. 1 can also include a magnet 169A that is disposed on a wall (e.g., the left wall) of the goggle portion 160. In this implementation, the magnet 169A can be included in an input mechanism (e.g., a magnetic input mechanism) of the integrated VR headset 100 that can be used to interact with VR content that is being executed or played on the electronic device 120. Such an input mechanism is described in further detail below, e.g., with respect to FIG. 2.

As illustrated in FIG. 1, the goggle portion 160 of the integrated shipping container and VR headset 100 can also include a ledge 168 that is disposed around an interior perimeter of the rectangular chassis of the goggle portion 160. The ledge 168 can be configured to physically support the electronic device 120 (e.g., retain the electronic device 120 near the open, first side of the goggle portion 160) when the electronic device 120 is inserted from the first (open) side of the goggle portion 160 defined by its rectangular chassis. In other words, the electronic device 120 can rest, set, etc., on the ledge 168, so as to position/secure the electronic device 120, in conjunction with the cover portion 110, in the integrated shipping container and VR headset 100 for shipping (e.g., with the electronic device 120 in a display 126 up orientation, as shown on the left in FIG. 1) and for viewing VR content displayed on the display 126 (e.g., with the electronic device 120 in a camera 122 and flash 124 up orientation, as shown on the right in FIG. 1). Example approaches for implementing such a ledge (e.g., the ledge 168) are illustrated in the accompanying figures and described in further detail below.

The cover portion 110 of the integrated shipping container and VR headset 100 of FIG. 1 can also include a rectangular chassis that is open on a first side (e.g., the side that is downward facing and, therefore, not visible in FIG. 1) that facilitates is placement over the goggle portion 160. In other implementations, the chassis of the cover portion can have other shapes, e.g., in correspondence with a shape of the chassis of the goggle portion. In this example, the cover portion 110 can also include a second side (e.g., the side that is upward facing in FIG. 1) that is at least partially closed. The second side of the cover portion 110 can also include an aperture 112 that is defined therein. The aperture 112 can be configured, oriented, located, etc., so as to allow for the camera 122 and the flash 124 of the electronic device 120 to be exposed through the cover portion 110 when the electronic device 120 is placed on the ledge 168 with the camera 122 and the flash 124 facing the second side of the cover portion 110, and the cover portion 110 is placed over the goggle portion 160, such as in the arrangement shown in FIG. 2.

As with the goggle portion 160, the rectangular chassis of the cover portion 110 of the integrated shipping container and VR headset 100 can include a left wall, a right wall, a bottom wall and a top wall, the left wall (e.g., with the bottom wall and the right wall not visible in FIG. 1). In the integrated shipping container and VR headset 100, left wall, the right wall, the bottom wall and the top wall of the cover portion 110 can define the open, first side of the cover portion 110, where the rectangular chassis and the corresponding open, first side of the cover portion 110 are configured such that the cover portion 110 can be slidably fit over the goggle portion 160. In such an arrangement, the rectangular chassis of the goggle portion 160, the ledge 168 and an interior surface of the second side of the cover portion 110 can retain (e.g., frictionally retain, mechanically retain, etc.) the electronic device 120 in the integrated shipping container and VR headset 100 for shipping (e.g., with the electronic device 120 in a display 126 up orientation) and for viewing VR content displayed on the display 126 (e.g., with the electronic device 120 in a camera 122 and flash 124 up orientation).

As briefly noted above, the cover portion 110 of the integrated shipping container and VR headset 100 can be configured to be placed (slidably fit) over the goggle 160 portion. In such an arrangement, at least a portion of, nearly all of, or all of the goggle portion 160 can be disposed within the cover portion 110, such that the electronic device 120 is retained (frictionally, mechanically, etc.) between the ledge 168 and an interior surface of the second side (e.g., the upward facing side of the cover portion 110 in FIG. 1) of the cover portion 110 (e.g., the upward facing side of the cover portion 110 in FIG. 1).

The integrated shipping container and VR headset 100, as shown in FIG. 1, can further include the protective liner 140. The protective liner 140 can be configured to be placed within (inserted into, and so forth) the goggle portion 160, so as to provide a protective cover for the lenses 152 and 153 and the lens assembly of the goggle portion 160 during shipment of the electronic device 120 using the integrated shipping container and VR headset 100. For instance, the protective cover 140 can prevent damage to the lenses 152 and 154 from the USB cable 132 and the headset 134 (as well as any other accessories that may be included in the integrated shipping container and VR headset 100) during shipment. As illustrated in FIG. 1, the protective liner 140 can include a tab 142, where the tab 142 is configured to facilitate removal of the protective liner 140 from the goggle portion 160, such as when a consumer is unpacking the electronic device 120 and its accessories, and is preparing the integrated VR headset 100 to view VR content.

The integrated shipping container and VR headset 100 of FIG. 1 can further include the sleeve 170 (an outer sleeve, a protective sleeve, etc.), where the sleeve 170 is configured to slidably fit over the goggle portion 160 and the cover portion 110 of the integrated shipping container and VR headset 100 when the cover portion 110 is placed (slidably fit) over the goggle portion 160, such as discussed above. In such an approach, the sleeve 170 may provide protection for the other components of the integrated shipping container and VR headset 100 (e.g., the lenses 152 and 154) during shipping and handling (e.g., from a manufacturer to a consumer). In certain implementations, the sleeve 170 can be secured to the cover portion 110 using one or more adhesive discs or strips (e.g., tape), which can be severed and/or removed to allow the sleeve 170 to be removed from the remainder of the integrated shipping container and VR headset 100.

Depending on the particular implementation, the cover portion 110, the protective liner 140, the goggle portion 160 and the sleeve 170 can be made of a number of different materials. The same materials can be used for each of these components of the integrated shipping container and VR headset 100, or different materials can be used. As some example materials, the cover portion 110, the protective liner 140, the goggle portion 160 and the sleeve 170 can be formed from cardboard, fiberboard, plastic, heavy paper stock, etc. In some implementations, the cover portion 110, the protective liner 140, the goggle portion 160 and the sleeve 170 can be formed using die-cutting techniques. In other implementations, other cutting (e.g., precision cutting) techniques may be used in place of die cutting, such as laser cutting, for example.

Figure 2:
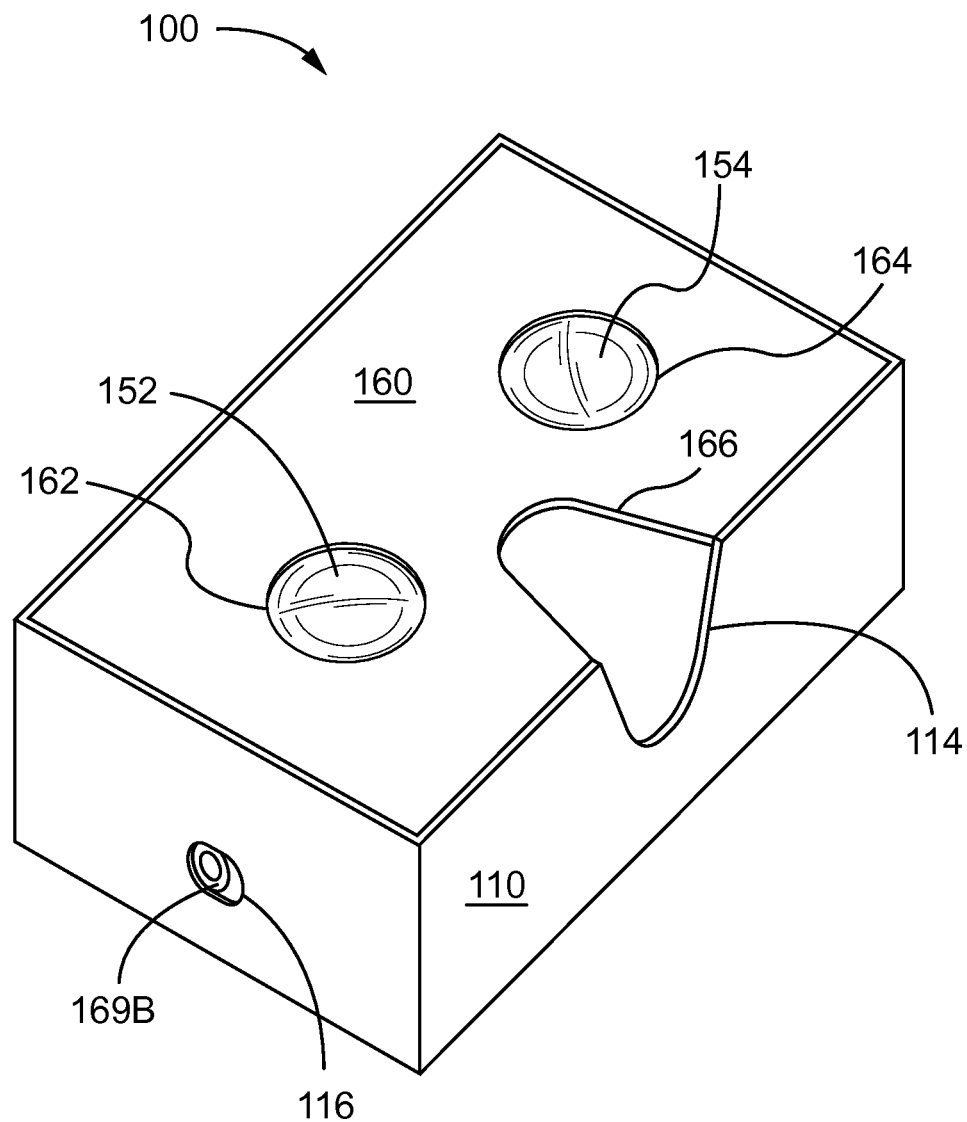
FIG. 2 is a diagram illustrating a front-side perspective view of the integrated shipping container and VR headset of FIG. 1, according to an implementation.

FIG. 2 is a diagram illustrating a front-side perspective view of the integrated shipping container and VR headset 100 of FIG. 1, according to an implementation. As shown in FIG. 2 (as well as in FIGS. 3-7), the integrated shipping container and VR headset 100 is illustrated in an arrangement for use as a VR headset (e.g., in conjunction with the electronic device 120). In the perspective view of FIG. 2, the integrated VR headset 100 is shown from a side (referred to here as the front side) that a user can place to, or near his or her face in order to view VR content displayed on the electronic device 120, when it is inserted in the integrated VR headset 100.

As was noted above, as illustrated in FIG. 2, the bottom wall of the rectangular chassis of the cover portion 110 includes a cutout 114 that corresponds with the cutout 166 in the goggle portion 160 of the integrated VR headset 100. The cutouts 114 and 166, as shown in FIG. 2, can be complimentary (e.g., aligned with each other) and configure to facilitate placement of the integrated VR headset 100 to a face of a user, with the cutouts 114 and 166 being placed over (about, around, etc.) the user's nose.

As illustrated in FIG. 2, as was discussed briefly above, the goggle portion 160 can have a magnet 169B disposed thereon that works, e.g., in conjunction with the magnet 169A show in FIG. 1, as an input mechanism for the VR integrated headset 100 to interact with VR content being executed or played by the electronic device 120. As shown in FIG. 2, the left wall of the cover portion 110 can have an aperture 116 defined therein, where magnet 169B is disposed within the aperture or slot 116 when the cover portion 110 is slidably fit over the goggle portion 160, such as illustrated in FIG. 2. In other words, the aperture or slot 116 (hereafter "slot 116") facilitates access to the magnet 169B of the input mechanism through the cover portion 110.

In the integrated VR headset 100 shown in FIG. 2, the magnet 169B can be slid (e.g., by an external force, such as from a user's finger) within the slot 116 (e.g., to the opposite end of the slot 154), causing the combined magnetic field produced by the magnets 169A and 169B to change. The electronic device 120 (e.g., when inserted in the integrated VR headset 100 to view VR content) may detect this change in the combined magnetic field as an input signal that allows a user to interact with a VR application or VR content that is being executed on the electronic device 120. When the external force on the magnet 169B is removed, the magnetic fields of the magnets 169A and 169B may cause the magnet 169B to return to its original position with the slot 116 (e.g., as shown in FIG. 2).

As shown in FIG. 2, the magnet 169B is disposed on the left wall of the rectangular chassis of the goggle portion 160 and the corresponding slot 116 is formed in the left wall of the rectangular chassis of the cover portion 110. In other implementations, the magnets 169A and 169B, and the slot 116 could be located, respectively, on a different walls (e.g., right walls, top walls or bottom walls) of the rectangular chassis of the goggle portion 160 and the rectangular chassis of the cover portion 110.

Figure 3:
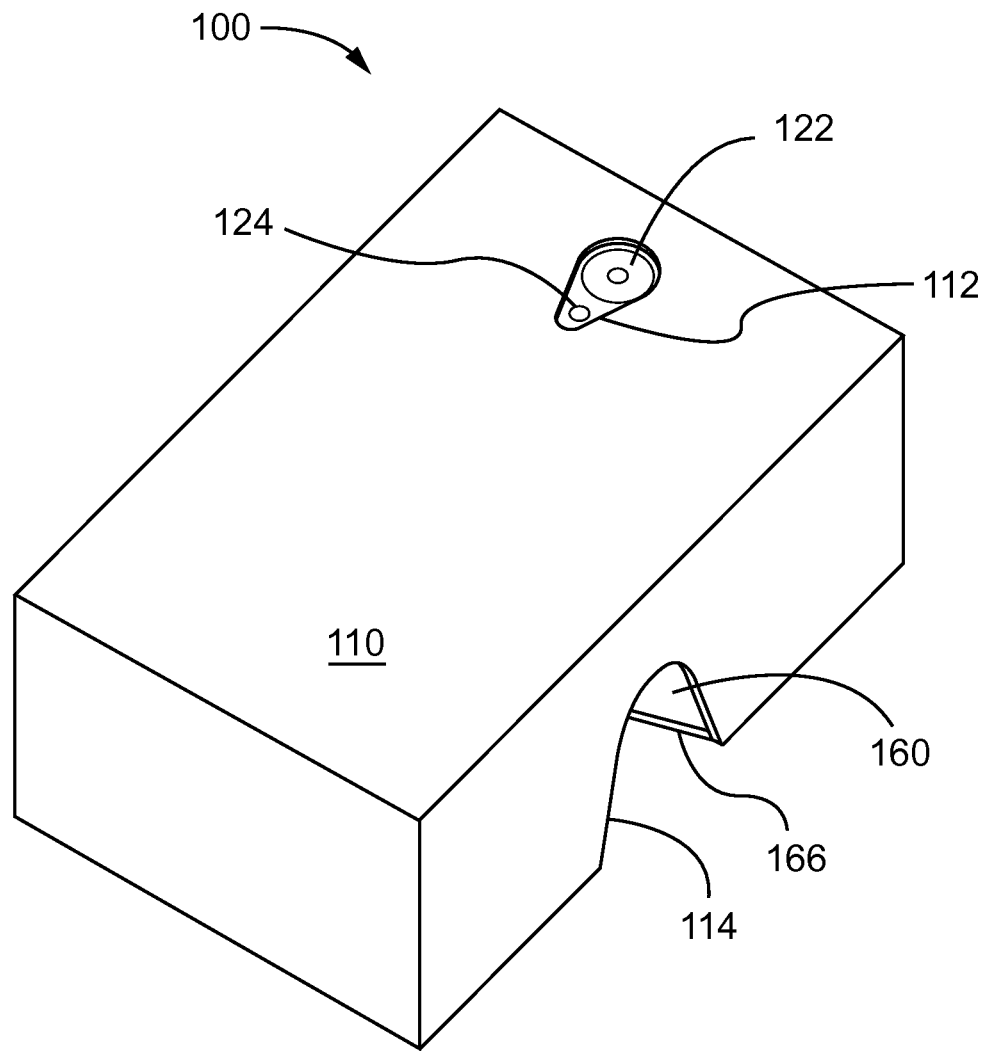
FIG. 3 is a diagram illustrating a back-side perspective view of the integrated shipping container and VR headset of FIG. 1, according to an implementation.

FIG. 3 is a diagram illustrating a back-side perspective view of the integrated shipping container and VR headset 100 of FIG. 1, according to an implementation. As shown in FIG. 2, the integrated shipping container and VR headset 100 is illustrated in FIG. 3 in an arrangement for use as a VR headset (e.g., in conjunction with the electronic device 120). In the perspective view of FIG. 3, the integrated VR headset 100 is shown rotated 180 degrees from the orientation shown in FIG. 2. As shown in FIG. 3, the camera 122 and the flash 124 of the electronic device 120 are exposed (visible) through the aperture 112 in the cover portion 110. Such as arrangement allows for the camera 122 and the flash 124 to the used when a user is interacting with VR content being executed or played by the electronic device 120. For instance, the camera 122 and/or flash 124 may be used to capture images and/or interact with a 3D visual token, such as described herein.

Figure 4:
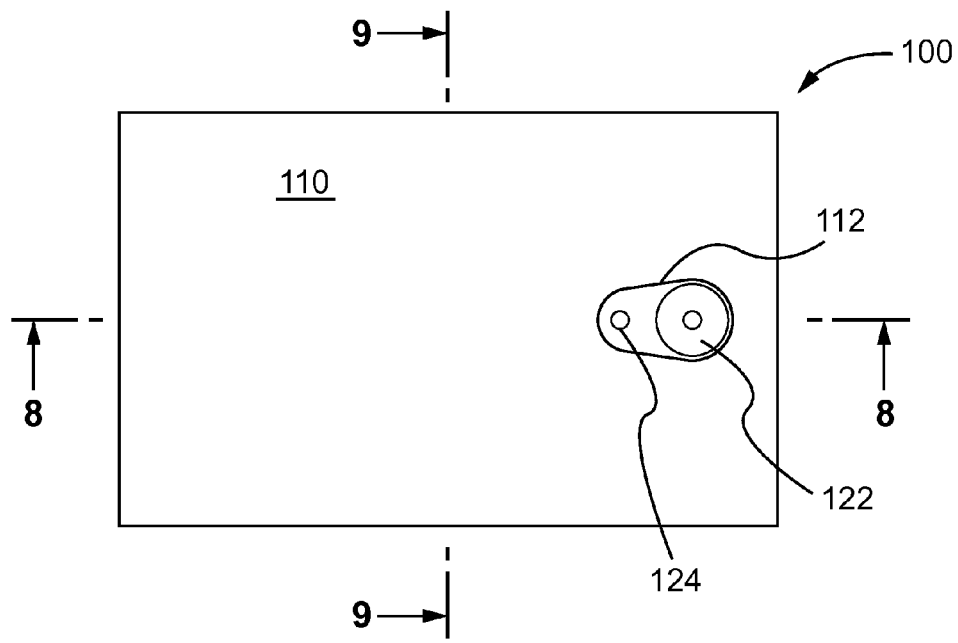
FIG. 4 is a diagram illustrating a back-side plan view of the shipping container and VR headset of FIG. 1, according to an implementation.

FIG. 4 is a diagram illustrating a back-side plan view of the integrated shipping container and VR headset 100 of FIG. 1, according to an implementation. As in FIGS. 2 and 3, the integrated shipping container and VR headset 100 is illustrated in FIG. 4 in an arrangement for use as a VR headset (e.g., in conjunction with the electronic device 120). As shown in FIG. 4, the camera 122 and the flash 124 of the electronic device 120 are visible (exposed) through the aperture 112 in the cover portion 110. FIG. 4 also illustrates section lines 8-8 and 9-9, which indicate cut lines for cross-sectional views of the cover portion 110 that are shown, respectively, in FIGS. 8 and 9.

Figure 5:
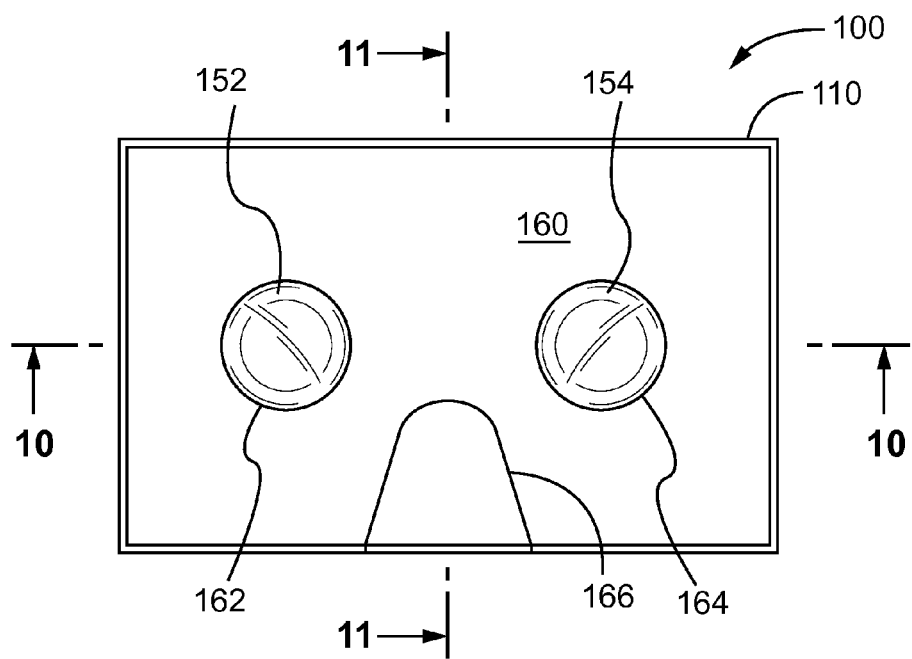
FIG. 5 is a diagram illustrating a front-side plan view of the shipping container and VR headset of FIG. 1, according to an implementation.

FIG. 5 is a diagram illustrating a front-side plan view of the integrated shipping container and VR headset 100 of FIG. 1, according to an implementation. As in FIGS. 2-4, the integrated shipping container and VR headset 100 is illustrated in FIG. 5 in an arrangement for use as a VR headset (e.g., in conjunction with the electronic device 120). As shown in FIG. 5, the goggle portion 160 can be disposed within the cover portion 110. In other words, the cover portion 110 can be slidably fit over the goggle portion 160. FIG. 5 also illustrates section lines 10-10 and 11-11, which indicate cut lines for cross-sectional views of the goggle portion 160 that are shown, respectively, in FIGS. 10 and 11.

Figure 6:
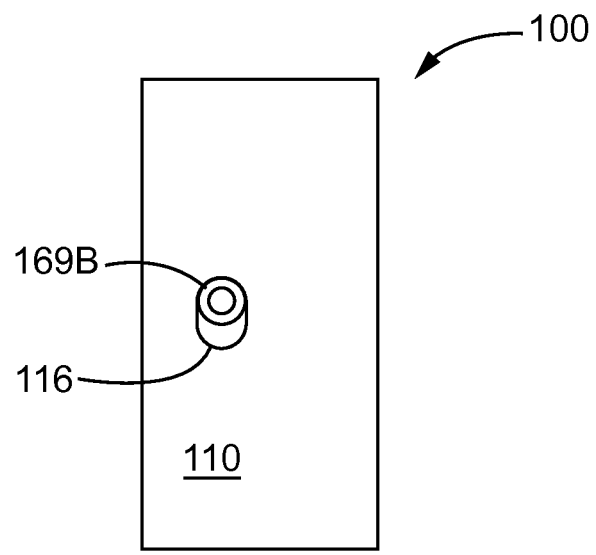
FIG. 6 is a diagram illustrating a left-side plan view of the shipping container and VR headset of FIG. 1, according to an implementation.

FIG. 6 is a diagram illustrating a left-side plan view of the integrated shipping container and VR headset 100 of FIG. 1, according to an implementation. As in FIGS. 2-5, the integrated shipping container and VR headset 100 is illustrated in FIG. 6 in an arrangement for use as a VR headset (e.g., in conjunction with the electronic device 120). As shown in FIG. 6, the slot 116 in the cover portion and the magnet 169B disposed on the goggle portion 160 can be arranged to be in alignment with the magnet 169A that is disposed on an internal surface of the left wall of the rectangular chassis of the goggle portion 160, such as illustrated in FIG. 1.

Figure 7:
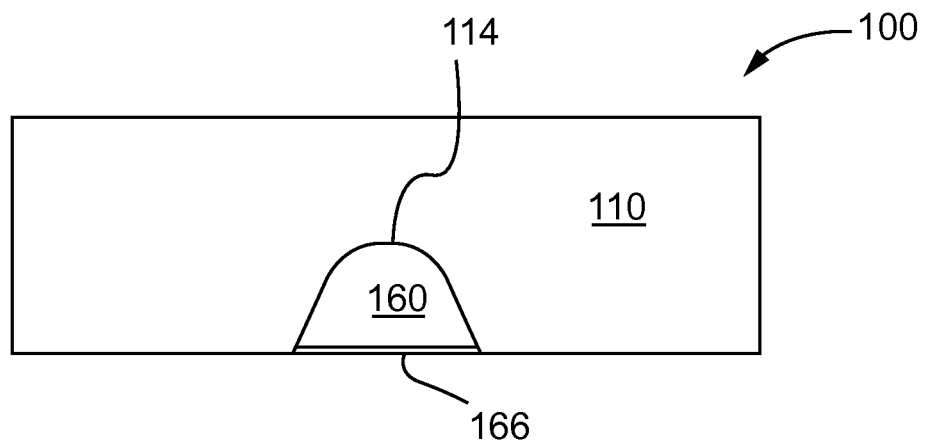
FIG. 7 is a diagram illustrating a bottom-side plan view of the shipping container and VR headset of FIG. 1, according to an implementation.

FIG. 7 is a diagram illustrating a bottom-side plan view of the integrated shipping container and VR headset 100 of FIG. 1, according to an implementation. As in FIGS. 2-6, the integrated shipping container and VR headset 100 is illustrated in FIG. 7 in an arrangement for use as a VR headset (e.g., in conjunction with the electronic device 120). As shown in FIG. 7, the cutouts 114 and 166 (e.g., for placement over a user's nose) are complimentary and aligned with each other in the corresponding parts of the cover portion 110 and the goggle portion 160.

Figure 8:
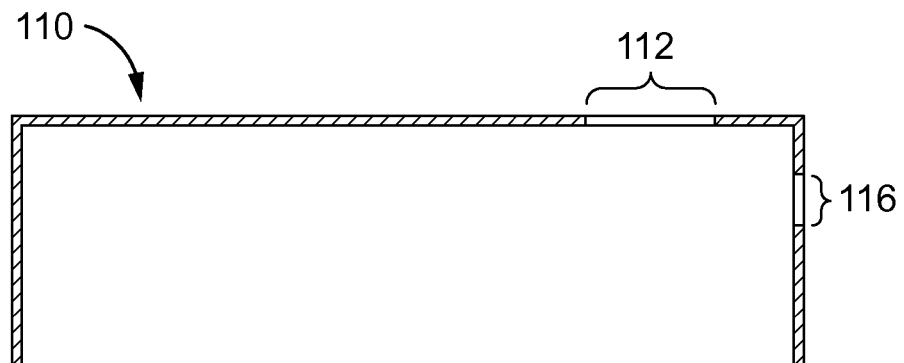
FIG. 8 is a diagram illustrating a cross-sectional view of a cover portion of the shipping container and VR headset of FIG. 1 along section line 8-8 in FIG. 4, according to an implementation.

FIG. 8 is a diagram illustrating a cross-sectional view of the cover portion 110 of the integrated shipping container and VR headset 100 of FIG. 1 along the section line 8-8 in FIG. 4, according to an implementation. In comparison with FIGS. 2-7, the cover portion 110, in the cross-sectional view of FIG. 8, is shown without the other elements of the integrated shipping container and VR headset 100 of FIG. 1, so as not to obscure the view shown in FIG. 8.

In the cross-sectional view of FIG. 8, an arrangement of the aperture 112 and the slot 116 of the cover portion 110 are shown. In other implementations, other arrangements for the aperture 112 and the slot 116 are possible. In still other implementations, the aperture 112 and/or the slot 116 can be eliminated. In yet other implementations, the cover portion 110, as shown in FIG. 8, could include other elements, such as an input button, for example.

Figure 9:
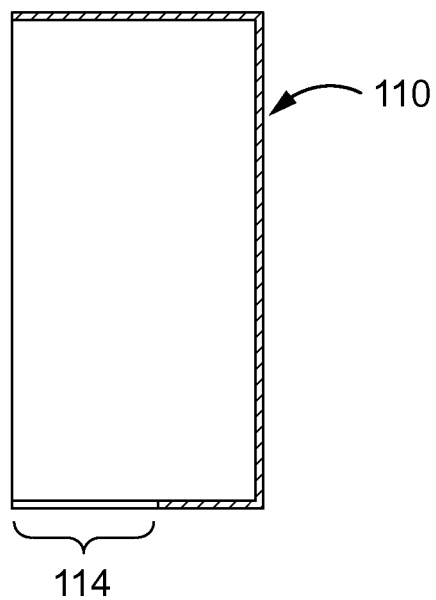
FIG. 9 is a diagram illustrating a cross-sectional view of the cover portion of the shipping container and VR headset of FIG. 1 along section line 9-9 in FIG. 4, according to an implementation.

FIG. 9 is a diagram illustrating a cross-sectional view of the cover portion 110 of the integrated shipping container and VR headset 100 of FIG. 1 along the section line 9-9 in FIG. 4, according to an implementation. As with FIG. 8, the cover portion 110, in the cross-sectional view of FIG. 9, is shown without the other elements of the integrated shipping container and VR headset 100 of FIG. 1, so as not to obscure the view shown in FIG. 9.

In the cross-sectional view of FIG. 9, an arrangement of the cutout 114 (e.g., for placement over a user's nose) in the cover portion 110 is shown. In other implementations, other arrangements for the cutout 114 are possible. In still other implementations, the cover portion 110, as shown in FIG. 9, could include other elements, such as an input button, for example.

Figure 10:
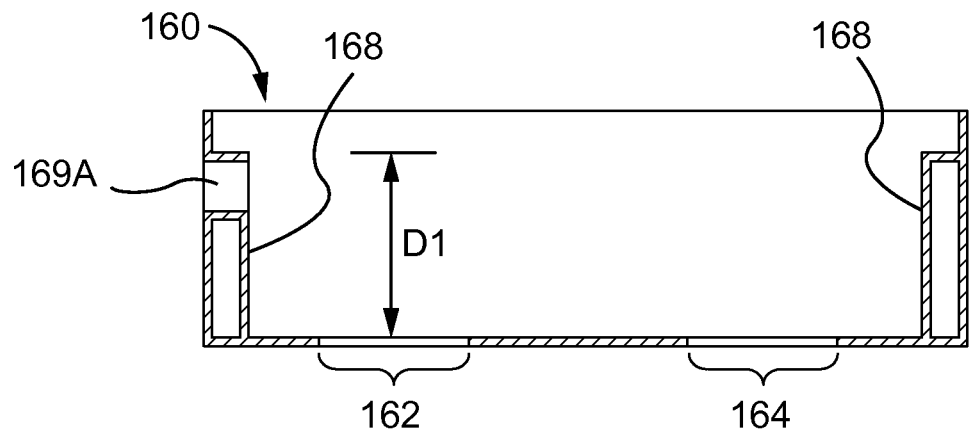
FIG. 10 is a diagram illustrating a cross-sectional view of a goggle portion of the shipping container and VR headset of FIG. 1 along section line 10-10 in FIG. 5, according to an implementation.

FIG. 10 is a diagram illustrating a cross-sectional view of the goggle portion 160 of the integrated shipping container and VR headset 100 of FIG. 1 along the section line 10-10 in FIG. 5, according to an implementation. As with the cross-sectional views of the cover portion 110 shown in FIGS. 8 and 9, the chassis of the goggle portion 160 is shown in the cross-sectional view of FIG. 10 without the other elements of the integrated shipping container and VR headset 100 of FIG. 1, so as not to obscure the view shown in FIG. 10.

In the cross-sectional view of FIG. 10, an arrangement of the lens apertures 162, 164 and the magnet 169 in the goggle portion 160 are shown. In other implementations, other arrangements for the lens apertures 162, 164 and the magnet 169A are possible. In still other implementations, the magnet 169A could be eliminated and/or replaced with a different input mechanism, such as a button, for example. In still other implementations, the goggle portion 160, as shown in FIG. 10, could include other elements.

Also shown in FIG. 10, is an example arrangement for the ledge 168 of the integrated shipping container and VR headset 100. The ledge 168 can be used (configured to, arrange to, etc.) support an electronic device for shipping (e.g., display side up) and for viewing VR content (e.g., display side down), such as was discussed above with respect to FIG. 1. The structure of the ledge 168 shown in FIG. 10 (and in FIG. 11) is given by way of example and shown for purposes of illustration. In other implementations, a ledge of an integrated shipping container and VR headset can have other arrangements, such as those described herein.

The ledge 168 can be defined (formed, constructed, etc.) using any number of appropriate materials, such as cardboard, fiberboard, plastic, paper pulp structures, etc. In certain implementations, the ledge 168 can be integrated with the goggle portion 160, affixed to the goggle portion 160 (e.g., using an adhesive) or can be a separate structure that is placed inside the goggle portion 168 in the arrangement shown in FIG. 10 (and FIGS. 1 and 11). As shown in FIG. 10, the structure of the ledge 168 can have an opening to accommodate the magnet 169A of the integrated shipping container and VR headset 100 in this implementation.

As also shown in FIG. 10, the surface of the ledge 168 on which an electronic device can be placed when viewing VR content with the integrated shipping container and VR headset 100 can be a distance D1 from the lens apertures 162, 164 of the goggle portion 160. In the integrated shipping container and VR headset 100, a focal length of the aspherical lenses 152, 154 can be determined based on the distance D1, so as to improve a user's experience when viewing VR content using the integrated shipping container and VR headset 100.

Figure 11:
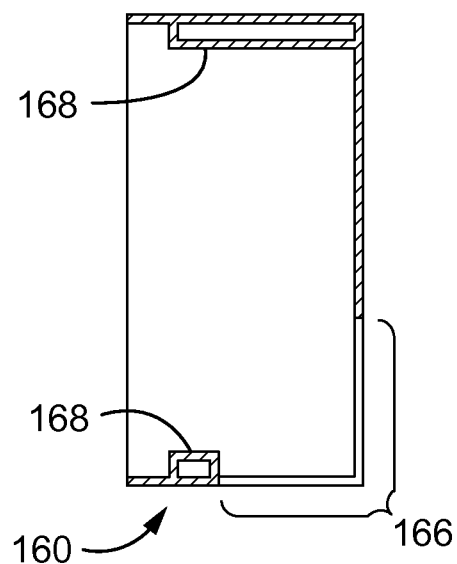
FIG. 11 is a diagram illustrating a cross-sectional view of the goggle portion of the shipping container and VR headset of FIG. 1 along section line 11-11 in FIG. 5, according to an implementation.

FIG. 11 is a diagram illustrating a cross-sectional view of the goggle portion 160 of the integrated shipping container and VR headset 100 of FIG. 1 along the section line 11-11 in FIG. 5, according to an implementation. As with FIG. 10, the chassis of the goggle portion 160, in the cross-sectional view of FIG. 11, is shown without the other elements of the integrated shipping container and VR headset 100 of FIG. 1, so as not to obscure the view shown in FIG. 11.

In the cross-sectional view of FIG. 11, an arrangement of the cutout 166 (e.g., for placement over a user's nose) in the goggle portion 160 is shown. In other implementations, other arrangements for the cutout 166 are possible. In still other implementations, the goggle portion 160, as shown in FIG. 11, could include other elements, such as an input mechanism.

Also shown in FIG. 11, the example arrangement for the ledge 168 of the integrated shipping container and VR headset 100 shown in FIG. 10 is further illustrated. As with FIG. 10, the structure of the ledge 168 shown in FIG. 11 is given by way of example and shown for purposes of illustration. In other implementations, a ledge of an integrated shipping container and VR headset can have other arrangements, such as those described herein. For this example implementation, as shown in FIG. 11, the structure of the ledge 168 can being arranged to accommodate the cutout 166 of the integrated shipping container and VR headset 100.

Figure 12:
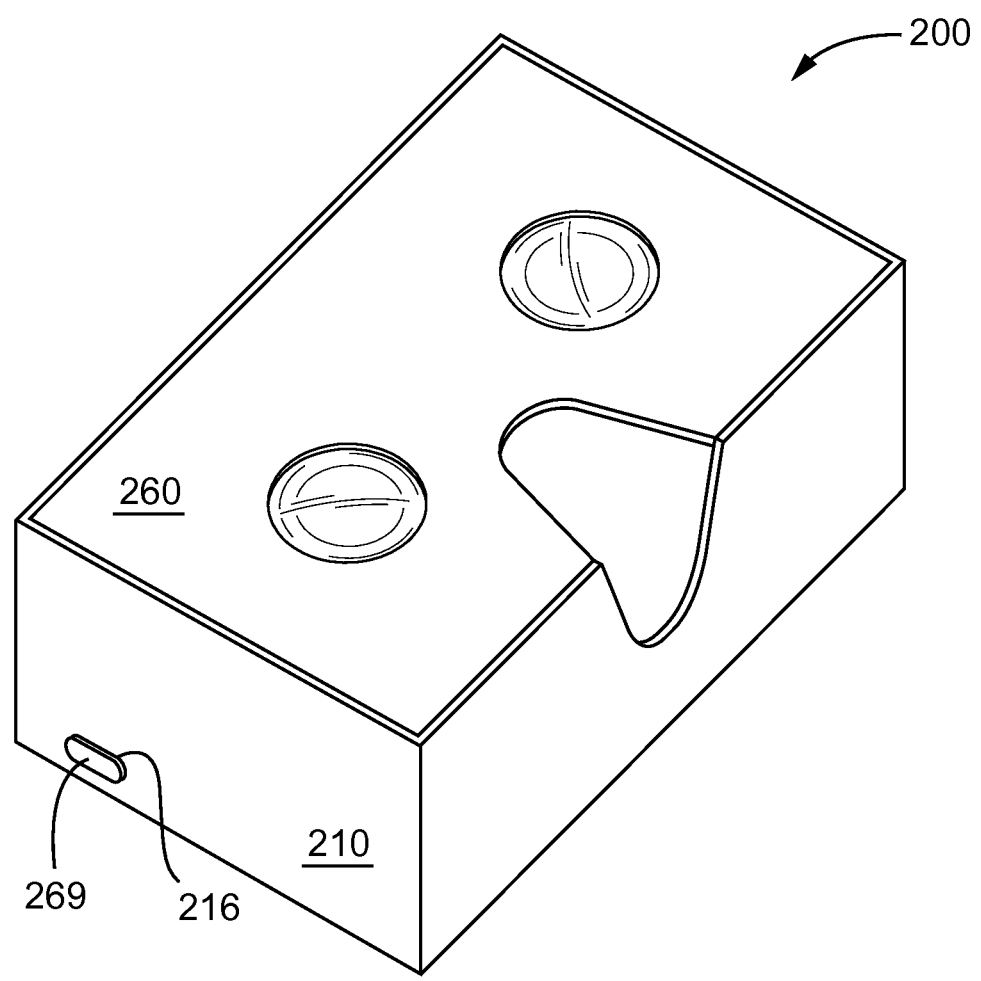
FIG. 12 is a diagram illustrating a front-side perspective view of another integrated shipping container and VR headset, according to an implementation.

FIG. 12 is a diagram illustrating a front-side perspective view of another integrated shipping container and VR headset 200 (integrated VR headset 200), according to an implementation. The integrated VR headset 200 is similar to the integrated VR headset 100. It will be appreciated, however, that integrated VR headsets having other configurations and arrangements are possible. For purposes of brevity and clarity, the details of the aspects of the integrated VR headset 200 that are similar to those of the integrated VR headset 100 are not described in detail again here with respect to FIG. 12.

As shown in FIG. 12, a cover portion 210 of the integrated VR headset 200 includes an aperture 216 that facilitates access to a button 269. In such an approach, the button 268 can be affixed, attached to and/or integrated with a goggle portion 260 of the integrated headset 200. In the integrated VR headset 200, the button 269 can be located on the goggle portion 260 such that it aligns with a button of a corresponding electronic device. For instance, the corresponding electronic device can be a device that is shipped using the integrated headset 200 as shipping container (e.g., along with an outer sleeve and a protective liner, such as those described herein).

In such an approach, the location of the button 269 can be based on the specific electronic device (or electronic devices) for which the integrated VR headset 200 is designed to be used as shipping container and VR headset for. In other words, the location of the button 269 can depend on where input buttons of a corresponding electronic device (or devices) that are suitable for use in interacting with VR applications and/or content are located on the corresponding electronic device (or devices). Accordingly, in other implementations, the location of the button 269 can vary, such as based on the specific electronic device (or devices) that are to be shipped using the integrated headset 200, as well use the integrated VR headset 200 to view images associated with VR applications and/or VR content.

FIGS. 13A-13D, 14A-14D, 15A-15D and 16A-16D are diagrams illustrating example configurations of ledge structures that can be implemented in an integrated mobile device shipping container (packaging) and VR headset, according to implementations. In FIGS. 13A-16D, elements of integrated shipping container and VR headsets 1300, 1400, 1500 and 1600 are shown to illustrate these example ledge configurations. For purposes of clarity, other elements of the integrated shipping container and VR headsets 1300, 1400, 1500 and 1600 are not shown in FIG. 13A-16D. For instance, FIGS. 13A-16D do not illustrate cutouts (e.g., for placement over a user's nose), input mechanisms, lens apertures, lenses, and so forth. It will be appreciated that these aspects of an integrated shipping container and VR headset can be incorporated in the implementations shown in FIGS. 13A-16D.

Figure 13A:
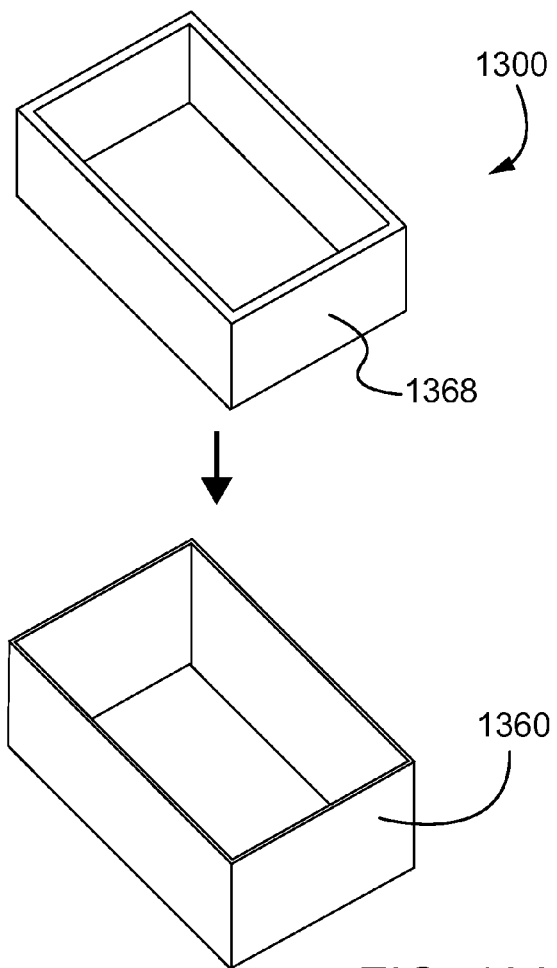
FIGS. 13A-13D are diagrams illustrating a ledge for supporting a mobile device in an integrated mobile device shipping container (packaging) and VR headset, according to an implementation.
Figure 13B:
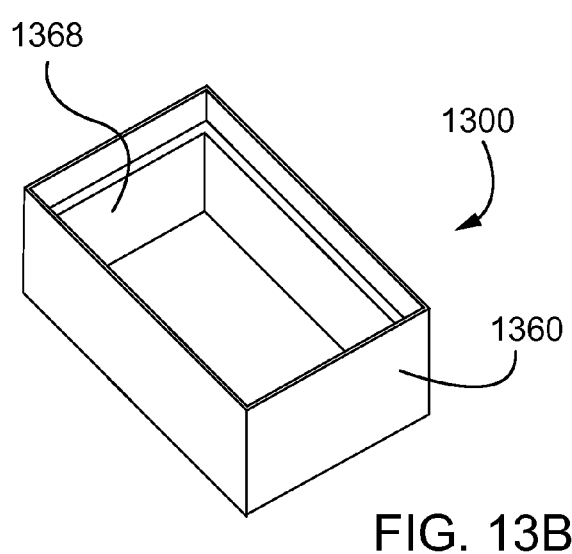

FIGS. 13A and 13B illustrate perspective views of a goggle portion 1360 and a ledge (ledge structure) 1368 of an integrated shipping container and VR headset 1300, according to an implementation. As shown in the perspective views FIGS. 13A and 13B, the ledge 1368 can be inserted into the goggle portion 1360 to define a ledge within the goggle portion 1360 that can be used to support an electronic device (such as the electronic device 120 discussed above), during shipment (e.g., in display face-up position) and for viewing VR content on the electronic device (e.g., in a display face-down position). The ledge 1368 can be affixed to the goggle portion 1360 using a number of approaches, such as adhesive strips, glue, etc. In other implementations, the ledge 1368 can be sized such that it is frictionally retained within the goggle portion 1360 without use adhesives (or otherwise). The goggle portion 1360 and the ledge 1368 can be constructed from any number of appropriate materials, such as those described herein.

Figure 13C:
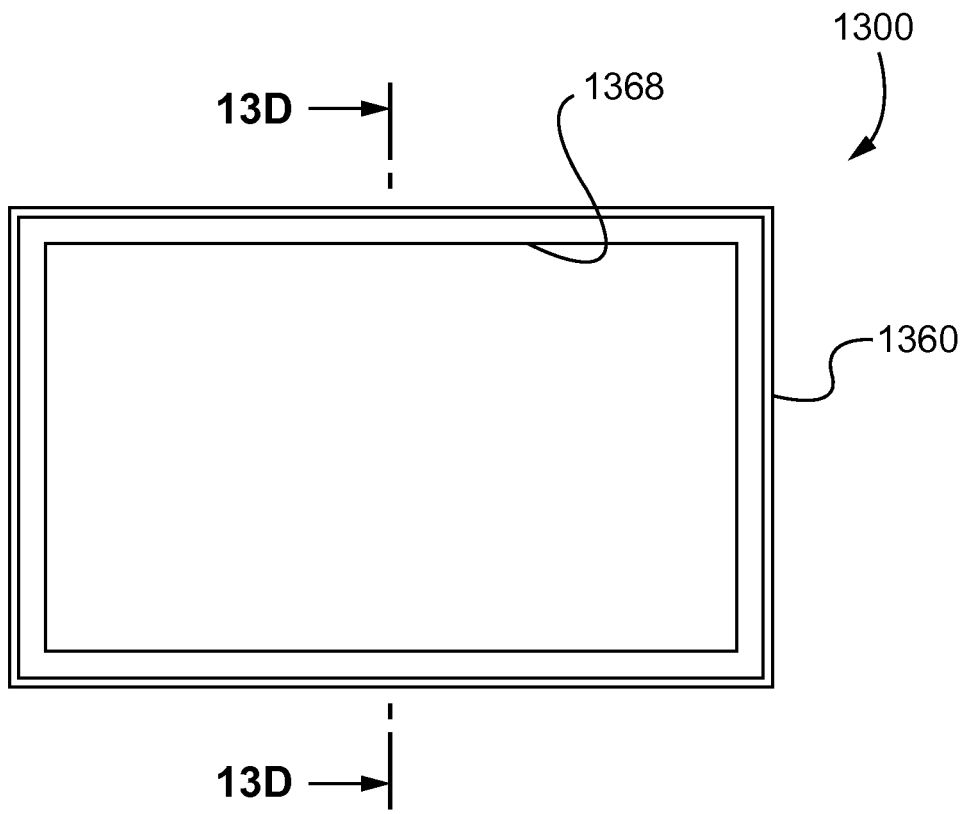
Figure 13D:
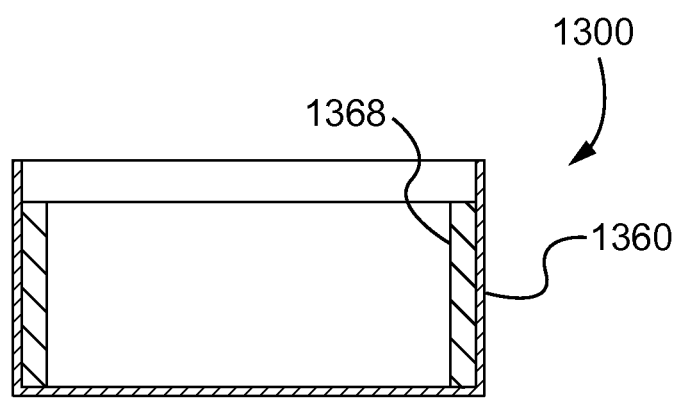

FIG. 13C is a drawing illustrating a top-side plan view of the integrated shipping container and VR headset 1300 in the configuration illustrated in FIG. 13B. As shown in the FIG. 13C, the ledge 1368 can be disposed around an interior perimeter of the goggle portion 1360. FIG. 13C also illustrates a section line 13D-13D, which indicates a cut line for a cross-sectional view of the integrated shipping container and VR headset 1300 that is shown in FIG. 13D. As shown in the cross sectional view of FIG. 13D, the ledge 1368 can be disposed within the goggle portion 1360, and can rest on (be disposed on) an inner surface of a bottom wall of the goggle portion 1360. The ledge 1368 can define a ledge within (recessed within) the goggle portion 1360 that is configured to support and electronic device (e.g., for shipment and/or viewing of VR content). As described herein, a cover portion (not shown) could be placed over the goggle portion 1360 to retain the electronic device within the goggle portion 1360.

Figure 14A:
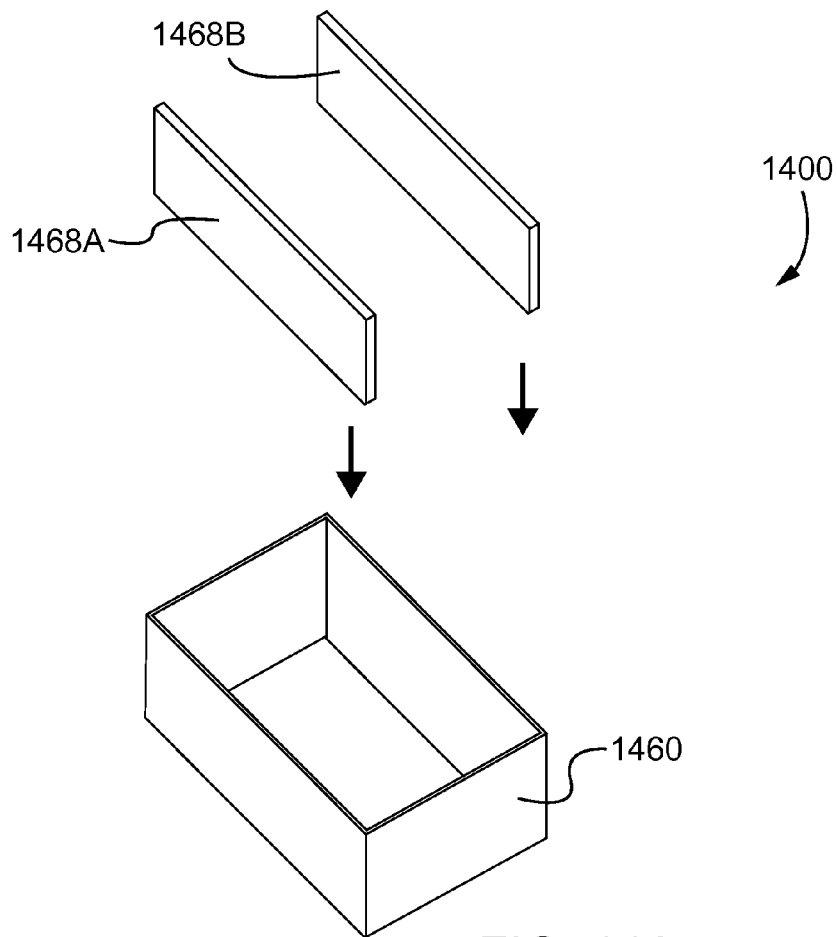
FIGS. 14A-14D are diagrams illustrating another ledge for supporting a mobile device in an integrated mobile device shipping container (packaging) and VR headset, according to an implementation.
Figure 14B:
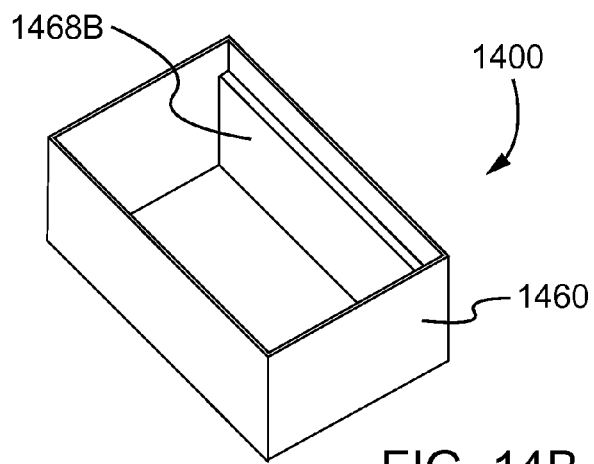

FIGS. 14A and 14B illustrate perspective views of a goggle portion 1460 and ledge (ledge structure) components 1468A, 1468B of an integrated shipping container and VR headset 1400, according to an implementation. As shown in the perspective views FIGS. 14A and 14B, the ledge components 1468A, 1468B can be inserted into the goggle portion 1460 to define a ledge within the goggle portion 1460 that can be used to support an electronic device (such as the electronic device 120 discussed above), during shipment (e.g., in display face-up position) and for viewing VR content on the electronic device (e.g., in a display face-down position). The ledge components 1468A, 1468B can be affixed to the goggle portion 1460 using a number of approaches, such as adhesive strips, glue, etc. In other implementations, the ledge components 1468A, 1468B can be sized such that they are frictionally retained within the goggle portion 1460 without use of adhesives (or otherwise). The goggle portion 1460 and the ledge components 1468A, 1468B can be constructed from any number of appropriate materials, such as those described herein.

Figure 14C:
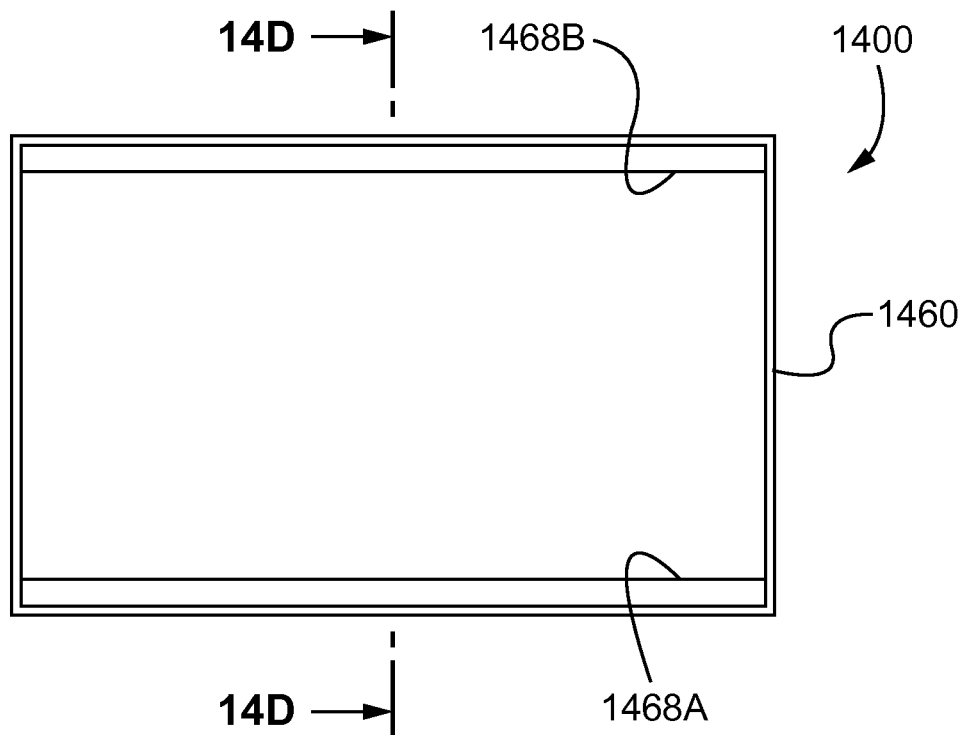
Figure 14D:
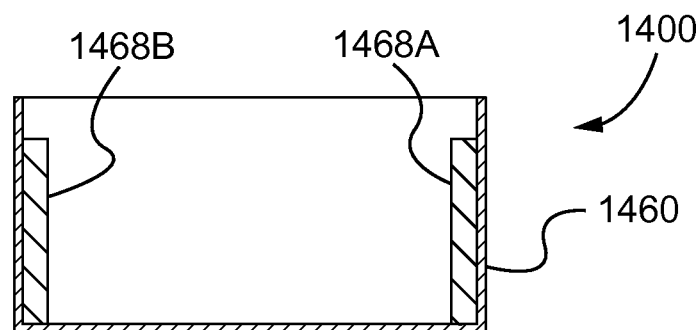

FIG. 14C is a drawing illustrating a top-side plan view of the integrated shipping container and VR headset 1400 in the configuration illustrated in FIG. 14B. As shown in the FIG. 14C, the ledge components 1468A, 1468B can be disposed along respective inner surfaces of opposing walls of the goggle portion 1460. FIG. 14C also illustrates a section line 14D-14D, which indicates a cut line for a cross-sectional view of the integrated shipping container and VR headset 1400 that is shown in FIG. 14D. As shown in the cross sectional view of FIG. 14D, the ledge components 1468A, 1468B can be disposed along opposing walls within the goggle portion 1460, also resting on an inner surface of a bottom wall of the goggle portion 1460. The ledge components 1468A, 1468B, as shown in FIG. 14D, can define a ledge within (recessed within) the goggle portion 1460 that is configured to support an electronic device (e.g., for shipment and/or viewing of VR content). As described herein, a cover portion (not shown) could be placed over the goggle portion 1460 to retain the electronic device within the goggle portion 1460.

Figure 15A:
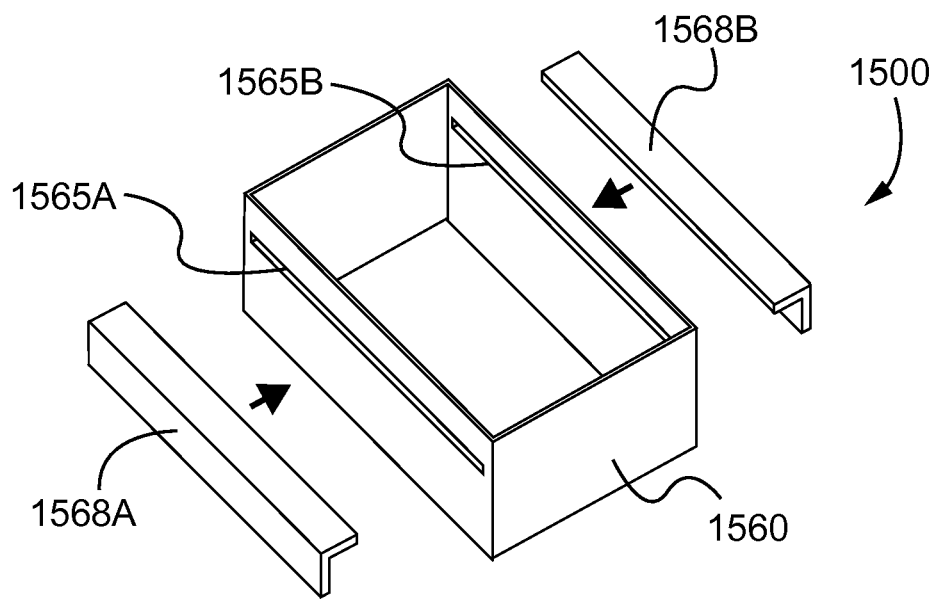
FIGS. 15A-15D are diagrams illustrating yet another ledge for supporting a mobile device in an integrated mobile device shipping container (packaging) and VR headset, according to an implementation.
Figure 15B:
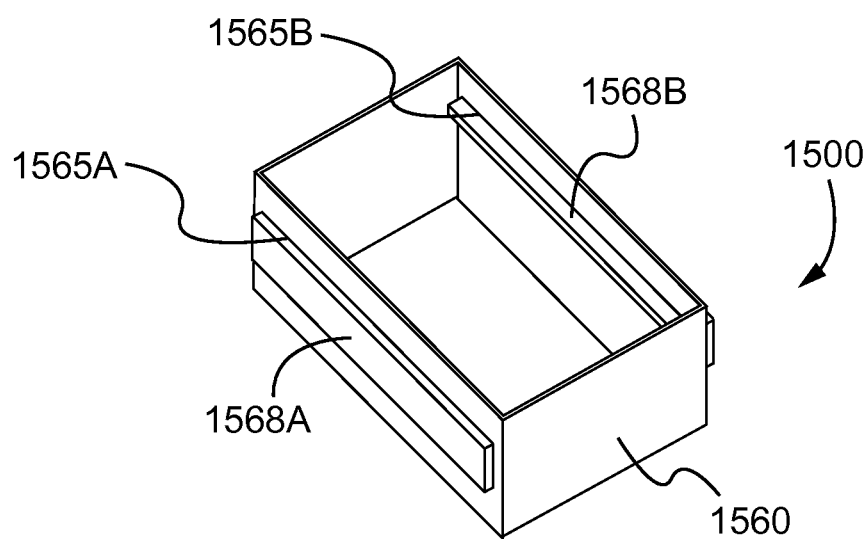

FIGS. 15A and 15B illustrate perspective views of a goggle portion 1560 and ledge (ledge structure) components 1568A, 1568B of an integrated shipping container and VR headset 1500, according to an implementation. As shown in the perspective views FIGS. 15A and 15B, the ledge components 1568A, 1568B can be inserted into respective slots 1565A, 1565B defined in the goggle portion 1560, so as to define a ledge within the goggle portion 1560 that can be used to support an electronic device (such as the electronic device 120 discussed above), during shipment (e.g., in display face-up position) and for viewing VR content on the electronic device (e.g., in a display face-down position). The ledge components 1568A, 1568B can be affixed to the goggle portion 1560 using a number of approaches, such as adhesive strips, glue, etc. In other implementations, other approaches can be used to retain the ledge components 1568A, 1568B within their respective slots 1565A, 1565B. The goggle portion 1560 and the ledge components 1568A, 1568B can be constructed from any number of appropriate materials, such as those described herein.

Figure 15C:
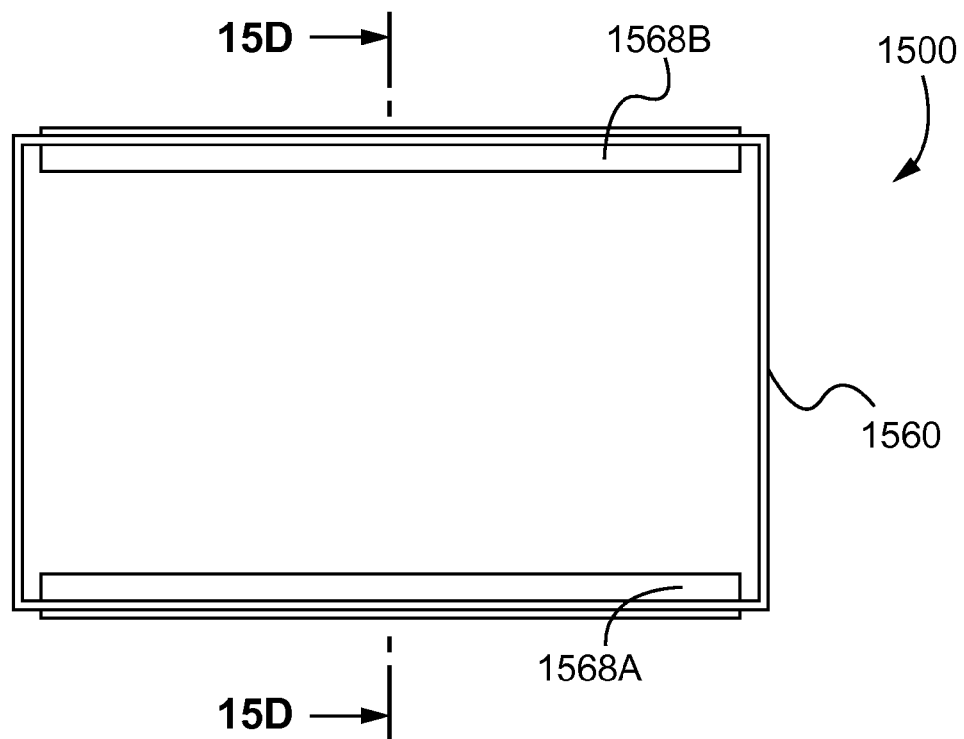
Figure 15D:
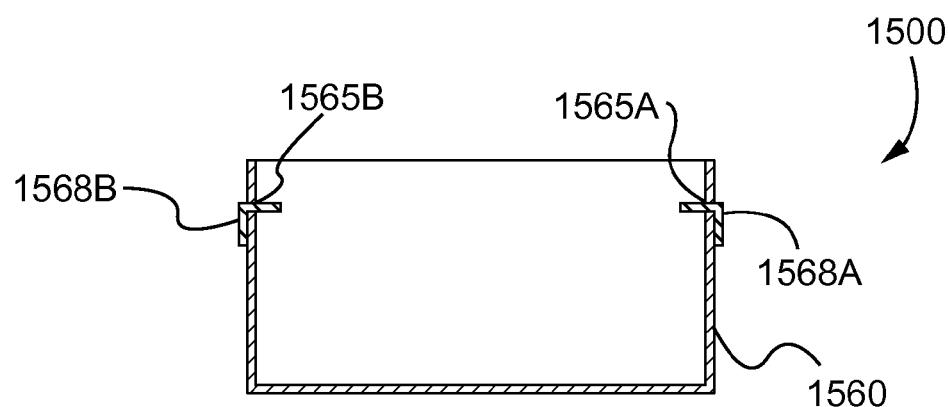

FIG. 15C is a drawing illustrating a top-side plan view of the integrated shipping container and VR headset 1500 in the configuration illustrated in FIG. 15B. As shown in the FIG. 15C, the ledge components 1568A, 1568B can be disposed along respective exterior surfaces of opposing walls of the goggle portion 1560 and extend into the goggle portion 1560 to form opposing sides of a ledge. FIG. 15C also illustrates a section line 15D-15D, which indicates a cut line for a cross-sectional view of the integrated shipping container and VR headset 1500 that is shown in FIG. 15D. As shown in the cross sectional view of FIG. 15D, the ledge components 1568A, 1568B can be disposed along exterior surfaces of opposing walls of the goggle portion and extend into the goggle portion 1560. The ledge components 1568A, 1568B, as shown in FIG. 15D, can define a ledge within (recessed within) the goggle portion 1560 that is configured to support an electronic device (e.g., for shipment and/or viewing of VR content). As described herein, a cover portion (not shown) could be placed over the goggle portion 1560 to retain the electronic device within the goggle portion 1560.

Figure 16A:
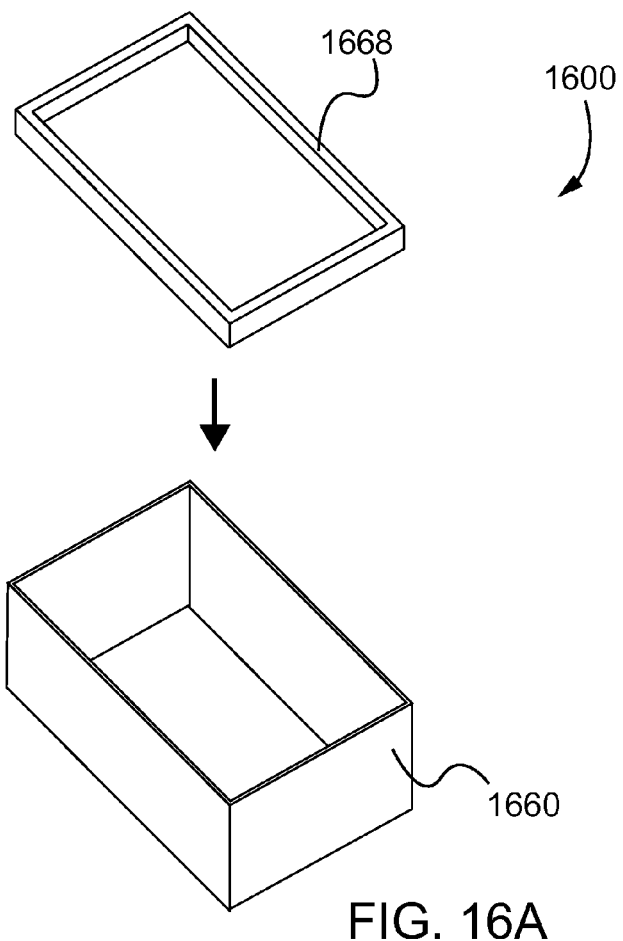
FIGS. 16A-16D are diagrams illustrating still another alternative ledge for supporting a mobile device in an integrated mobile device shipping container (packaging) and VR headset, according to an implementation.
Figure 16B:
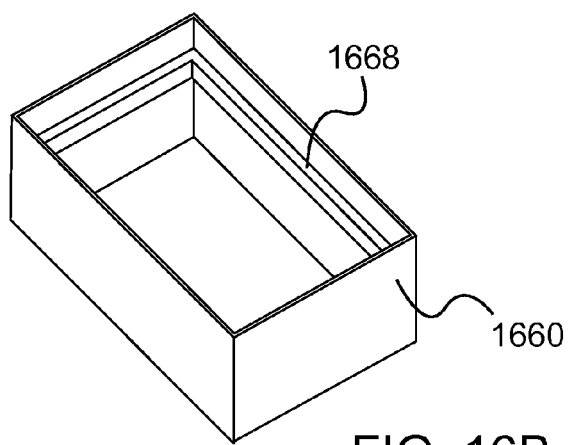

FIGS. 16A and 16B illustrate perspective views of a goggle portion 1660 and a ledge (ledge structure) 1668 of an integrated shipping container and VR headset 1600, according to an implementation. As shown in the perspective views FIGS. 16A and 16B, the ledge 1668 can be inserted into the goggle portion 1660 to define a ledge within the goggle portion 1660 that can be used to support an electronic device (such as the electronic device 120 discussed above), during shipment (e.g., in display face-up position) and for viewing VR content on the electronic device (e.g., in a display face-down position). The ledge 1668 can be affixed to the goggle portion 1660 using a number of approaches, such as adhesive strips, glue, etc. In other implementations, In other implementations, other approaches can be used to retain the ledge 1668 in a fixed position within the goggle portion 1660 (such as illustrated in FIG. 16B). The goggle portion 1660 and the ledge 1668 can be constructed from any number of appropriate materials, such as those described herein.

Figure 16C:
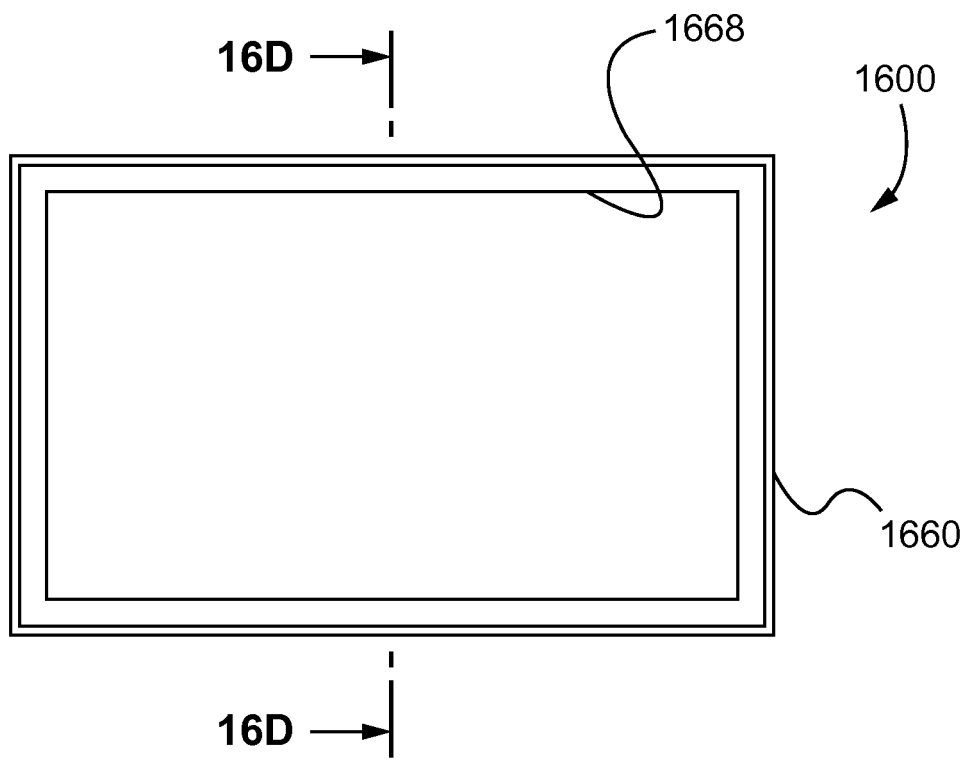
Figure 16D:
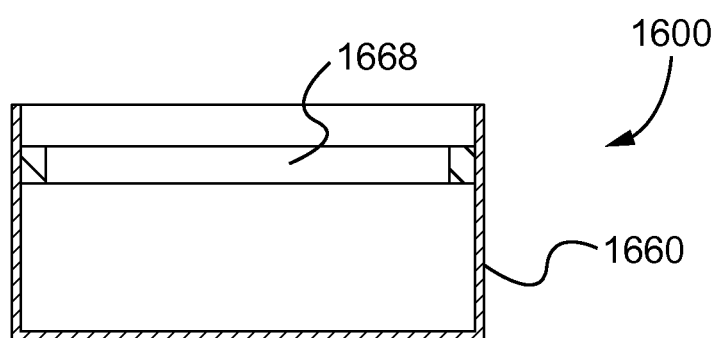

FIG. 16C is a drawing illustrating a top-side plan view of the integrated shipping container and VR headset 1600 in the configuration illustrated in FIG. 16B. As shown in the FIG. 16C, the ledge 1668 can be disposed around an interior perimeter of the goggle portion 1660. FIG. 16C also illustrates a section line 16D-16D, which indicates a cut line for a cross-sectional view of the integrated shipping container and VR headset 1600 that is shown in FIG. 16D. As shown in the cross sectional view of FIG. 16D, the ledge 1668 can be disposed within (recessed within) the goggle portion 1660. The ledge 1668 can define a ledge within the goggle portion 1660 that is configured to support and electronic device (e.g., for shipment and/or viewing of VR content). As described herein, a cover portion (not shown) could be placed over the goggle portion 1660 to retain the electronic device within the goggle portion 1660.

In a general aspect, an apparatus can include a goggle portion having a chassis that is open on a first side, a lens assembly disposed on a second side of the chassis of the goggle portion and a ledge disposed around an interior perimeter of the chassis of the goggle portion. The ledge can be configured to physically support an electronic device inserted from the first side of the chassis of the goggle portion. The apparatus can also include a cover portion having a chassis that is open on a first side and at least partially closed on a second side. The cover portion can be configured to be placed over the goggle portion, such that at least a portion of the goggle portion is disposed within the cover portion and the electronic device is retained between the ledge and an interior surface of the second side of the cover portion.

Implementations can include one or more of the following features. For instance, the chassis of the goggle portion can includes a left wall, a right wall, a bottom wall and a top wall. The left wall, the right wall, the bottom wall and the top wall of the goggle portion can define the open, first side of the goggle portion. The lens assembly and the bottom wall can have a cutout defined therein. The cutout can be configured for placement over a nose of a user.

The chassis of the cover portion can include a left wall, a right wall, a bottom wall and a top wall. The left wall, the right wall, the bottom wall and the top wall of the cover portion can define the open, first side of the cover portion. The bottom wall can have a cutout defined therein. The cutout can be configured for placement over a nose of a user.

The lens assembly can include a first aperture, a second aperture, a first aspherical lens disposed within the first aperture and a second aspherical lens disposed within the second aperture. A focal length of the first aspherical lens and a focal length of the second aspherical lens can be based, at least in part, on a distance from the lens assembly to a surface of a display of the electronic device when the electronic device is placed on the ledge with the display facing the lens assembly.

The second side of the cover portion can have an aperture defined therein. The aperture can be configured to expose a camera of the electronic device when the electronic device is placed on the ledge with the camera facing the second side of the cover portion and the cover portion is placed over the goggle portion.

The apparatus can include an input mechanism disposed on the chassis of the goggle portion. The input mechanism can be configured to interact with the electronic device. The input mechanism can include a magnetic input device. The input mechanism can include a button. The input mechanism can be disposed on one of the left wall of the chassis of the goggle portion and the right wall of the chassis of the goggle portion. The chassis of the cover portion can include an aperture that is configured to facilitate access to the input mechanism when the cover portion is placed over the goggle portion.

The apparatus can include a sleeve configured to slidably fit over the goggle portion and the cover portion when the cover portion is placed over the goggle portion. The apparatus can include a protective liner configured to be placed within the goggle portion to cover the lens assembly. The protective liner can include a tab disposed thereon, the tab being configured to facilitate removal of the protective liner from the goggle portion.

In another general aspect, an article of manufacture can include a goggle portion having a chassis that is open on a first side, a lens assembly disposed on a second side of the chassis of the goggle portion and a ledge disposed around an interior perimeter of the chassis of the goggle portion. The article of manufacture can also include a cover portion having a chassis that is open on a first side and at least partially closed on a second side. The cover portion can be configured to be placed over the goggle portion, such that at least a portion of the goggle portion is disposed within the cover portion. The article of manufacture can further include a protective liner configured to be placed within the goggle portion to cover the lens assembly. The article of manufacture can also further include a sleeve configured to slidably fit over the goggle portion and the cover portion when the cover portion is placed over the goggle portion.

Implementations can include one or more of the following features. For instance, the lens assembly can include a first aperture, a second aperture, a first aspherical lens disposed within the first aperture and a second aspherical lens disposed within the second aperture. The article of manufacture can include an input mechanism disposed on the chassis of the goggle portion, the input mechanism being configured to interact with an electronic device disposed within the article of manufacture. The protective liner can include a tab disposed thereon, the tab being configured to facilitate removal of the protective liner from the goggle portion.

A number of implementations have been described. Nevertheless, it will be understood that various modifications can be made without departing from the spirit and scope of the invention.

What is claimed is:
1. An apparatus comprising:
 a container that is both a shipping container for an electronic device and a virtual reality headset, the container including:
  a goggle portion including:
   a chassis that is open on a first side;
   a lens assembly disposed on a second side of the chassis of the goggle portion, the second side being opposite the first side of the chassis of the goggle portion; and
   a ledge disposed around an interior perimeter of the chassis of the goggle portion, the ledge being configured to physically support the electronic device inserted from the first side of the chassis of the goggle portion; and a cover portion including:
a chassis that is open on a first side and at least partially closed on a second side,
the cover portion being configured to be slidably placed over the goggle portion, such that at least a portion of the goggle portion is disposed within the cover portion and the electronic device is retained between the ledge and an interior surface of the second side of the cover portion.

2. The apparatus of claim 1, wherein the chassis of the goggle portion includes a left wall, a right wall, a bottom wall and a top wall, the left wall, the right wall, the bottom wall and the top wall defining the open, first side of the goggle portion.

3. The apparatus of claim 2, wherein the lens assembly and the bottom wall have a cutout defined therein, the cutout being configured for placement over a nose of a user.

4. The apparatus of claim 1, wherein the chassis of the cover portion includes a left wall, a right wall, a bottom wall and a top wall, the left wall, the right wall, the bottom wall and the top wall defining the open, first side of the cover portion.

5. The apparatus of claim 4, wherein the bottom wall has a cutout defined therein, the cutout being configured for placement over a nose of a user.

6. The apparatus of claim 1, wherein the lens assembly includes:
a first aperture;
a second aperture;
a first aspherical lens disposed within the first aperture; and
a second aspherical lens disposed within the second aperture.

7. The apparatus of claim 6, wherein a focal length of the first aspherical lens and a focal length of the second aspherical lens are based, at least in part, on a distance from the lens assembly to a surface of a display of the electronic device when the electronic device is placed on the ledge with the display facing the lens assembly.

8. The apparatus of claim 1, wherein the second side of the cover portion has an aperture defined therein, the aperture being configured to expose a camera of the electronic device when the electronic device is placed on the ledge with the camera facing the second side of the cover portion and the cover portion is placed over the goggle portion.

9. The apparatus of claim 1, further comprising an input mechanism disposed on the chassis of the goggle portion, the input mechanism being configured to interact with the electronic device.

10. The apparatus of claim 9, wherein the input mechanism includes a magnetic input device.

11. The apparatus of claim 9, wherein the input mechanism includes a button.

12. The apparatus of claim 9, wherein the input mechanism is disposed on one of a left wall of the chassis of the goggle portion and a right wall of the chassis of the goggle portion.

13. The apparatus of claim 9, wherein the chassis of the cover portion includes an aperture configured to facilitate access to the input mechanism when the cover portion is placed over the goggle portion.

14. The apparatus of claim 1, further comprising a sleeve configured to slidably fit over the goggle portion and the cover portion when the cover portion is placed over the goggle portion.

15. The apparatus of claim 1, further comprising a protective liner configured to be placed within the goggle portion to cover the lens assembly.

16. The apparatus of claim 15, wherein the protective liner includes a tab disposed thereon, the tab being configured to facilitate removal of the protective liner from the goggle portion.

17. An article of manufacture comprising:
a container that is both a shipping container for an electronic device and a virtual reality headset, the container including:
a goggle portion including:
a chassis that is open on a first side;
a lens assembly disposed on a second side of the chassis of the goggle portion, the second side being opposite the first side of the chassis of the goggle portion; and
a ledge disposed around an interior perimeter of the chassis of the goggle portion;
a cover portion including:
a chassis that is open on a first side and at least partially closed on a second side,
the cover portion being configured to be slidably placed over the goggle portion, such that at least a portion of the goggle portion is disposed within the cover portion;
a protective liner configured to be placed within the goggle portion to cover the lens assembly; and
a sleeve configured to slidably fit over the goggle portion and the cover portion when the cover portion is placed over the goggle portion.

18. The article of manufacture of claim 17, wherein the protective liner includes a tab disposed thereon, the tab being configured to facilitate removal of the protective liner from the goggle portion.

19. The article of manufacture of claim 17, wherein the lens assembly includes:
a first aperture;
a second aperture;
a first aspherical lens disposed within the first aperture; and
a second aspherical lens disposed within the second aperture.

20. The article of manufacture of claim 17, further comprising an input mechanism disposed on the chassis of the goggle portion, the input mechanism being configured to interact with an electronic device disposed within the article of manufacture.

* * * * *